(12) United States Patent
Lyman et al.

(10) Patent No.: US 9,135,580 B1
(45) Date of Patent: Sep. 15, 2015

(54) SYSTEMS AND METHODS FOR PARKING VEHICLES

(71) Applicants: Ian Lyman, Beaverton, OR (US); Tov Arneson, Seattle, WA (US)

(72) Inventors: Ian Lyman, Beaverton, OR (US); Tov Arneson, Seattle, WA (US)

(73) Assignee: Parkt, Inc., Beaverton, OR (US)

( * ) Notice: Subject to any disclaimer, the term of this patent is extended or adjusted under 35 U.S.C. 154(b) by 0 days.

(21) Appl. No.: 14/054,517

(22) Filed: Oct. 15, 2013

Related U.S. Application Data

(60) Provisional application No. 61/713,921, filed on Oct. 15, 2012.

(51) Int. Cl.
*G06K 15/00* (2006.01)
*G06Q 10/02* (2012.01)
*G06Q 30/04* (2012.01)

(52) U.S. Cl.
CPC ............... *G06Q 10/02* (2013.01); *G06Q 30/04* (2013.01)

(58) Field of Classification Search
CPC ............ H04Q 9/00; G06K 2017/0051; G06K 7/10445; G06Q 10/087; G06Q 30/0284

USPC ......................................... 235/378; 705/5, 13
See application file for complete search history.

(56) References Cited

U.S. PATENT DOCUMENTS

| 6,085,124 | A * | 7/2000 | Choi | 700/217 |
| 2002/0077953 | A1 * | 6/2002 | Dutta | 705/37 |
| 2008/0051951 | A1 * | 2/2008 | Camacho | 701/23 |
| 2012/0130777 | A1 * | 5/2012 | Kaufman | 705/13 |
| 2012/0310712 | A1 * | 12/2012 | Baughman et al. | 705/13 |
| 2013/0143536 | A1 * | 6/2013 | Ratti | 455/414.1 |
| 2013/0214041 | A1 * | 8/2013 | Wright | 235/378 |
| 2013/0346121 | A1 * | 12/2013 | Shealy et al. | 705/5 |
| 2014/0257943 | A1 * | 9/2014 | Nerayoff et al. | 705/13 |

* cited by examiner

*Primary Examiner* — Allyson Trail
(74) *Attorney, Agent, or Firm* — Joseph S. Makuch; Andrew P. Lahser

(57) ABSTRACT

In one embodiment, a method includes associating a pre-existing dataset to one or more physical entities via association with an encoded token; monitoring interactions between the entity and the token; providing data from the dataset to the entity based on that monitoring; and updating the dataset with new or modified data from the entity by referencing the encoded token. In another embodiment, a method includes transmitting a vehicle retrieval request to a service provider including a delivery location; generating a listing event based on transmission of retrieval request; and transmitting a dataset back to retrieval requester.

17 Claims, 24 Drawing Sheets

US 9,135,580 B1

SYSTEMS AND METHODS FOR PARKING VEHICLES

CROSS-REFERENCE TO RELATED APPLICATIONS

This application claims priority from U.S. Provisional Patent Application Ser. No. 61/713,921 filed Oct. 15, 2012, entitled "Systems And Methods For Parking Vehicles" which is incorporated by reference.

BACKGROUND

A personal vehicle is a popular mode of transportation. Vehicles have access to vast networks of roadways allowing for flexible travel times and routes. However, using a personal vehicle for transportation often comes with a significant constraint, that is, if a driver or occupant of a vehicle desires to exit the vehicle when they've reached their destination, the vehicle must be parked while the driver or occupant is away from it.

Suitable parking can be difficult to locate. If suitable parking is available, the parking process may involve time consuming and confusing steps. Furthermore, suitable parking may have an associated cost that requires a financial transaction occur between a parking provider and a customer, which can further complicate the parking process.

Due to the many possible combinations in parking transaction type and payment processes, the entities that provide parking services use different types of parking processes. For example, municipalities often offer parking on public property or streets. Some private entities are solely in the business of making a profit by providing parking services. Other entities, such as shopping malls, hotels, or casinos provide parking services to attract customers to a primary business. Many different types of parking processes are utilized by the parking providers. Some example processes are valet parking, pay on entrance parking, lots or garages, or metered street parking. A parking provider may offer one or more parking services at a parking location. Parking providers sometimes make parking processes available at only limited times.

Lack of uniformity in parking services can be frustrating for many drivers, especially when driving in high-traffic areas. Drivers often select a parking service after reaching the general vicinity of a destination. Parking providers try to communicate key details the parking they have available with signs placed near the entrance to a parking facility. As part of the parking process, drivers are often forced to circle the block looking for parking and must make split-second decisions when selecting a parking provider based on limited information displayed on the signs posted by parking providers. Drivers may end up using a parking service poorly matched to the driver's parking needs. Auto accidents may occur when a driver's attention is diverted from driving to reading parking signs. The search for parking may also increase traffic congestion, waste fuel, and increase pollution.

Once a driver finds parking, further confusion may occur related to the transaction. For example, a driver may realize that his or her credit card is not a payment method accepted by the parking provider after parking and exiting his vehicle. The driver must then obtain the necessary form of payment causing delay and possibly be issued a parking citation. Those at pay-at-exit lots may get stuck behind a line of other drivers prior to exiting if multiple drivers attempt to exit at the same time.

Some parking providers have made efforts to improve parking transactions by using on-site automated parking systems. These systems can be configured to process or verify payments. Automated parking systems can be frustrating for customers to operate, expensive to maintain, difficult to locate and lacking in uniformity. Like a transaction with an attendant, customers may experience delay while waiting in line behind other customers to use an automated parking system.

Valet parking is one option that can offer a driver a more pleasant parking experience. In a valet-type parking, control of a vehicle is turned over to parking staff, usually located near the driver's destination. Once the parking staff obtains control of the vehicle, a valet parks the vehicle. When the driver wishes to retrieve the vehicle he or she typically walks to a nearby valet station and makes an in-person retrieval request for the vehicle. The customer cannot depart until the vehicle is retrieved by valet staff, which may lead to delay. A bottleneck may occur during the retrieval process if multiple customers make concurrent retrieval requests. Payment for valet parking is typically processed manually by the same parking staff responsible for retrieving vehicles leading to additional delay for waiting customers.

Although valet parking can provide a more convenient parking experience for the customer, it can be a relatively more expensive service for a parking provider to provide. Compared to other types of parking, valet parking has higher labor costs associated with staffing the drop/pickup area, manually processing payments, and parking and retrieving vehicles. Maintaining adequate staffing levels to minimize delay experienced by customers adds to these costs. Customers must return to the valet station to pick up their vehicle. Some parking providers offer parking to consumers at parking lots and garages.

Sometimes these parking facilities are located within prime commercial or entertainment districts, leading to overcrowding and lack of capacity due to their proximity to customer's destinations. It is very expensive to add additional capacity in prime areas due to the cost of real estate and construction. Other parking facilities are located adjacent to prime commercial and entertainment districts, but not close enough to be as desirable for use by customers. These non-prime facilities are underutilized compared to the prime locations.

DETAILED DESCRIPTION

Figure 1:
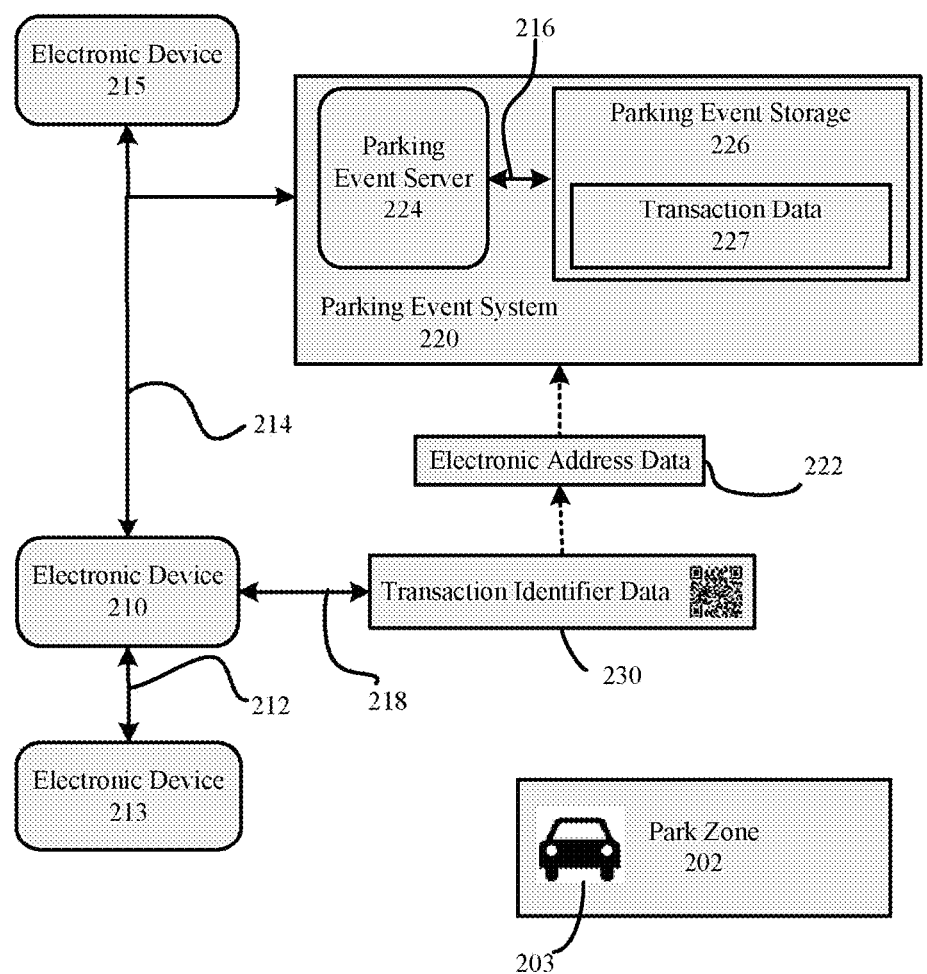
FIG. 1 illustrates an embodiment of a parking system that manages parking events and provides two way data communications via unique transaction data identifiers to intelligently manage parking events according to some of the inventive principles of this patent disclosure.

FIG. 1 shows a block diagram of a parking system 200 in accordance with an embodiment of the present invention. The Parking System 200 may include, among other things, a park zone 202, a first electronic device 210, a second electronic device 213, and third electronic device 215, a parking event system 220, and transaction identifier data 230 associated with electronic address data 222. The parking event system 220 may include a parking event server 224 and parking event storage 226. The parking event storage 226 may include transaction data 227.

Communications paths 214 and 218 may provide connectivity between electronic device 210, the transaction identifier data 230 and the parking event system 220 respectively. Communications path 215 may provide connectivity between the first electronic device and the second electronic device 213. Communications path 216 may provide connectivity between the parking event server 224 and the parking event storage 226. Other various network components and embodiments may also be provided.

A parking transaction involves the storage or parking of a vehicle. A parking transaction refers to a transaction conducted between a parking provider and a customer. The customer may refer to a person or entity that requests information related to a parking transaction. Typically, the customer is a person who utilized the parked vehicle for transportation. It is understood that the customer may be another person or entity that seeks information about the parking transaction. Thus, the customer may be another person or entity that wishes to make a payment toward the parking transaction. Some parking transactions may be associated with more than one customer. For example, a customer may be a business that desires to pay for or validate the parking its patrons. In another example, the customer is an employer wishing to pay for the parking of its employees.

The vehicle is typically an automobile. However, it is understood that the vehicle could include any machine used to move a person, such as but not limited to, a recreational vehicle, a boat, motorcycle, Segway®, airplane or bicycle. It should be understood that the vehicle may travel on land, water, or through the air or combination of more than one medium.

The park zone 202 refers to a physical space where the vehicle is parked or stored during a parking transaction. The park zone 202 may refer to a parking lot, a physical structure such as a parking garage, municipal parking or on-street parking. In some embodiments, park zone 202 may include all municipal on-street parking in a geographic area. For example, the geographic area may be neighborhood or a city. In some embodiments, park zone 202 refers to all space in a geographic area associated with a certain parking provider. For example, the park zone 202 may include a combination of parking lots and garages managed or otherwise serviced by a parking provider. In some embodiments, the park zone 202 may include a marina, park or airplane hangar.

The vehicle may be stored in the park zone 202 temporarily or for the majority of the parking transaction. The park zone 202 may include a load and/or unload zone. A load and unload zone is often used in a valet embodiment. In some embodiments, the park zone 202 may include a load zone and an unload zone at different physical locations.

In some embodiments, the vehicle may be stored within the park zone 202 for a majority of the time associated with the parking transaction. As examples, the park zone 202 may include a parking garage or all municipal street parking within a geographically defined boundary. In some embodiments, the vehicle is not kept within the park zone 202 for the majority of the parking transaction. For example, the park zone 202 may be a load and/or unload zone in embodiments that include valet parking transactions. In a valet embodiment, it is understood that the vehicle may be moved from the park zone 202 to another location during part of the time associated with the parking transaction. If the size of the park zone 202 is such that just a few vehicles may fit, moving the vehicle to another location during the parking transaction may be desirable in order to accommodate additional vehicles and associated parking transactions. If the park zone 202 is used as a temporary drop zone it may allow more customers to obtain the benefits associated with the park zone 202, especially if the park zone is located adjacent to a destination where parking is scarce. Usually, but not always, a customer obtains the vehicle from the park zone 202 at the end of end of the parking transaction. In a valet parking transaction, the vehicle is usually moved from one location to a more convenient location for the customer when the customer requests that the vehicle be retrieved.

Parking Event Server—

The parking event server may process the transaction data 227 and related data. The parking event server 224 may manage access to the transaction data 227. The parking event server 224 may communicate with the first electronic device 210, second electronic device 211, third electronic device 215, additional electronic devices or combinations thereof. The parking event server may communicate the transaction data 227 to the first, second, or third electronic devices or combinations thereof.

The parking event server 224 may include one or more network interface components. The one or more network interface components may be contained within or communicatively coupled to the parking event server 224. The network interface components may include one or more network interface cards (NIC) or a network controller. In some embodiments, the network interface may include a personal area network (PAN) interface.

The parking event server 224 may be configured as a database server. The parking event server 224 may be configured as a web server able to receive http requests and transmit http responses. In some embodiments, the parking event server 224 includes Application Programming Interface (API). The parking event server 224 may be configured to operate Apache or MySQL applications. The parking event server 224 may be configured to operate using the Unix or Linux operating systems. However, it is understood by one of ordinary skill in the art that a variety of operating system configurations and server application software may be utilized in the parking event server 224. It is understood that the parking event server 224 and parking event storage 226 may be used by more than one parking event system.

Parking Event Storage 226—

The parking event storage 226 may consist of any suitable storage for storing the transaction data 227. Parking event storage 226 may include one or more data storage devices. Parking event storage 226 may utilize a redundant array of disks, tape, disk, or other computer accessible storage. Parking event storage 226 may be a storage area network, an internet small computer systems interface (iSCSI) SAN, a Fibre Channel SAN, a common Internet File System (CIFS), network attached storage (NAS), or a network file system (NFS).

The parking event storage 226 may include a memory system. The memory system may be a random access memory RAM. The memory system may include memory of the parking event server 224. The parking event storage 226 may utilize non-volatile memory, volatile, or both. As examples, parking event storage 226 may include DRAM, SRAM, solid state drive (SSD), FLASH or a combination thereof. It may be preferable to utilize memories as the parking event storage 226 because they may allow the parking event server 224 to access the data in the parking event storage 226 at faster rates.

Parking event storage 226 may be remote, local, or a combination thereof with respect to the parking event server 224. The parking event storage 226 may be located within the same case or housing as the parking event server 224. In some embodiments, shorter distances between the parking event server 224 and parking event storage 226 may allow the parking event server 224 to access data stored in the parking event storage 226 at faster rates.

Path 216—

Communication path 216 provides connectivity between the parking event storage 226 and the parking event server 224. Path 216 may utilize a bus. Path 216 may utilize cabled network or telecom connections such as an Ethernet RJ45/Category 5 Ethernet connection, a fiber connection, a traditional phone wireline connection, a cable connection or other wired network connection. Path 216 may include wireless connectivity. Path 216 may include any suitable communication path as described below for path 214.

First Electronic Device 210—

The first electronic device 210 is a device capable of data communication with the parking event system 220. The first electronic device 210 may include a processor. The first electronic device 210 may include storage. The storage of the first electronic device 210 may include memory and/or disk storage. The storage of the electronic device 210 may include equivalent storage as discussed above for the parking event storage 226. The first electronic device 210 may include a unique identifier such as, but not limited to, a media access control (MAC) address. The unique identifier may be stored in the parking event storage 226. The electronic device 210 may include one or more network interface components. The one or more network interface components may be contained within or communicatively coupled to the electronic device 210. The network interface components may include one or more network interface cards (NIC) or a network controller. In some embodiments, the network interface may include a personal area network (PAN) interface.

The first electronic device 210 may include a microprocessor system, microcontroller, or field programmable gate array (FGPA). The first electronic device 210 may include a computer. The computer may be a desktop computer or a notebook computer. The first electronic device 210 may be configured to operate as a server. In some embodiments, the first electronic device may include a portable electronic device. In some embodiments it is preferable to use a handheld device or portable electronic device as the first electronic device 210. In some embodiments, the electronic device 210 may include a mobile telephone, cell phone, music player, PDA, smart phone, laptop computer, notebook computer, or tablet computer. As examples, the electronic device 210 may be a Blackberry, IPOD®, IPAD®, iPhone®, Android device, or a Windows-based Smartphone.

The first electronic device 210 includes a first data key. The first data key may be transmitted to the parking event server 224. The parking event server 224 may set an access level to the transaction data for the first electronic device 210 based on the first data key. In one embodiment, the first data key may correspond to a parking provider type of user. It may desirable for the parking provider type of user to be accorded access to the transaction data. If the first electronic device 210 transmits the first data key to the parking event server 224, the parking event server 224 will associate the first electronic device 210 the parking provider level of access to the transaction data 227. In other embodiments, the first data key may correspond to a customer of parking services or a third party business that may validate parking transactions. In one embodiment, the parking provider level of access may allow electronic device to modify the transaction data 227. Thus, the first key may allow an electronic device that submits it to modify the transaction data.

Path 214—

The parking event system 220 and the first electronic device 210 may be communicatively coupled through the path 214. The parking event system 220 and the first electronic device 210 may communicate data through the path 214. The parking event system 220 may transmit and/or receive data from the first electronic device 210 through the path 214. The parking event system 220 may transmit transaction data 227 to the first electronic device 210. Data may be transmitted from the first electronic device 210 to the parking event system 220. Path 214 may be used to communicatively couple the second electronic device 213, third electronic device 215, or additional electronic devices to the parking event system 220. Thus, the second or third electronic devices, or additional electronic devices may be configured to communicate with the parking event system 220 as discussed herein for the first electronic device 210.

The path 214 may include a system or protocol suitable for transmitting and/or receiving data communication between the first electronic device 210 and the parking event system 220. The path 214 may include a system providing wired connectivity, a system providing wireless connectivity or combinations thereof. For example, path 214 may include a system for wired connectivity using a protocol such as IEEE 802.3. Path 214 may include wireless connectivity based on protocols such as Bluetooth, Wireless Application Protocol (WAP), Global System for Mobile communications (GSM) based systems, Code Division Multiple Access (CDMA) based systems, Transmission Control Protocol/Internet Protocols (TCP/IP). The electronic device 210 and the parking event system 220 may be configured to use wireless protocols such as, but not limited to, IEEE 802.11a, 802.11b and 802.11g. In some embodiments, the communications path 214 includes the appropriate cellular network that provides cellular service to the electronic device 210. It should be understood the path 214 may involve communication through a network router or other intermediary system or device.

The path 214 may include more than one protocol and signal type. The use of more than one protocol and signal type for path 214 is desirable to promote compatibility with a wide range of network interfaces and, correspondingly, a wide range of configurations of the electronic device 210 and parking event system 220. The use of more than one protocol and signal type for path 214 may be used because it is typically desirable for the electronic device to be able to establish connectivity with the parking event system 220 at a wide array of locations. It is understood that some signals are not accessible at some locations. For example, a location may not have a CDMA signal available but may have an 802.11g signal available. If the path 214 uses 802.11g signal, the electronic device 210 may only be able to obtain connectivity with the parking event system 220 that would not be possible if the path 214 were limited to a CDMA signal.

Multiple Electronic Devices—

The second electronic device 213 and the third electronic device 215 may include the components and functionality disclosed herein for the first electronic device 210. The second electronic device 213 may include a second data key. The third electronic device 215 may include a third data key. In some embodiments, the second electronic device and the third electronic device may include the components and functionality disclosed herein for the first electronic device 210. In some embodiments, first second and third electronic devices 210, 213, 215 may be associated with different keys. In other words, the first key, second key, and third key may be distinct. In some embodiments, more than three devices may be used.

Path 218—

The first electronic device 210 may be configured to transmit and receive data through path 218. The data transmitted, received or retrieved through path 218 may include the transaction identifier data 230. The data transmitted, received or retrieved through path 218 may include the transaction identifier data 230. The path 218 may include any suitable communication path as described above for the communications path 214. The path 218 may be used to provide connectivity between two electronic devices. In one embodiment, the transaction identifier data 230 may be displayed on the display of the second electronic device 213.

The first electronic device 210 may include a user interface (UI). The first electronic device 210 may include an interface device capable of receiving data. The interface device may include a human interface device. The interface device may include a device such as a keyboard, keypad, microphone or touchscreen. The interface device may be contained within or be communicatively coupled to the electronic device 210. In embodiments where the electronic device 210 includes a keyboard, a person may input the transaction identifier data 230 into the electronic device 210 using the keyboard. The first electronic device 210 may include an audio/video recognition/conversion module. In some embodiments, the interface device may be configured to record the transaction identifier data 230 in an audio signal form. The electronic device 210 may allow a person to input the transaction identifier data 227 as audio data. The audio data may be generated by a person speaking characters or words. The characters or words may be the transaction identifier data 230. In some embodiments, the audio data is provided by a device that outputs an audio signal using a speaker. The audio signal outputted by the device corresponds to the transaction identifier data 230. The first electronic device 210 may convert the transaction identifier data 230 into the address data 220.

The first electronic device 210 may include a file input module. The file input module may be contained within or be communicatively coupled to the electronic device 210. The first electronic device 210 may be configured to receive a data file. The data file may include a computer readable medium. The data file may contain the transaction identifier data 230. The file may contain transaction identifier data 230 related to one or more parking transactions.

The electronic device 210 may include a digital imaging device such as a digital camera, optical reader, or an optical scanner. The digital imaging device may be contained within or be communicatively coupled to the electronic device 210.

The electronic device 210 may include an RFID or NFC reader. The RFID or NFC reader may be configured to receive the transaction identifier data 230 from an RFID or NFC transmitter or chip. The electronic device 210 may also include a RFID or NFC transmitter. The RFID or NFC transmitter may make data available to be received. The data may include the transaction identifier data 230. The RFID or NFC reader and/or transmitter may be contained within or be communicatively coupled to the electronic device 210.

The electronic device 210 may include or be communicatively coupled to a display device. The display may display images and data for the electronic device 210. The display may be any suitable display, such as an analog or digital television, a cathode ray display (CRT), a liquid crystal display (LCD), a light emitting diode (LED) based display, an organic (OLED) based display, a cathode ray tube (CRT) display. In some embodiments, the display may include a touch screen through which a user may interact with the electronic device 210.

The electronic device 210 may be configured to present the transaction identifier data 230 via the display. The electronic device 210 may be configured to present information related to the parking transaction via the display. The information may be presented with a user interface or a graphical user interface. In some embodiments, the electronic device 210 is configured to display the transaction data 227. The display device may be contained within or be communicatively coupled to the electronic device 210.—

The electronic device 210 may include a parking management system. A parking management system refers to a machine or system that may be used to assist with a parking transaction. The parking management system may be located in a parking facility or nearby area accessible to the operator of the parking management system. Example parking management systems are the Citypal® and the Strada Pay Station® by Parkeon®. The parking management system may be used in parking transactions configured as Pay and Display, Pay-by-Space and Pay-by-Plate. The parking management system may include or be communicatively coupled to a server, parking meter, mechanically actuated gate, or a payment kiosk.

The parking management system may be configured to be integrated with the parking management system. It is understood that the parking management system may operate independently of the present invention. That is, the parking management system does not need any embodiment of the present invention to be used in a parking transaction. The parking management system may be used together with the parking event system 220 to provide additional options to the parking provider or the customer related to the parking transaction.

In one exemplary embodiment, the parking management system includes a payment kiosk, server, and gate system located in a parking lot. The parking management system may be communicatively coupled to an entrance and/or exit gate. In some embodiments, the parking management system includes a server. The parking management system may communicate with the parking event system 220 over the path 214 to determine the payment status for a parking transaction. The parking management system may use the address data to contact the parking event server. The parking event system 220 communicates the payment status data to the parking management system server 224. The parking event server 224 may modify the transaction data 227 to reflect that driver has satisfied a condition of the parking transaction. The condition of the parking transaction may include completing a payment or obtaining validation from a category of business.

Transaction Data—

The transaction data 227 may be contained upon or within the parking event storage 226. The transaction data 227 may be contained upon or within a computer readable media. The transaction data 227 includes data or information associated with the parking transaction. The transaction data 227 may include information on the price, retrieval options available to different users, one or more electronic devices and their access levels, a time associated with the start of the transaction, a transaction number, available transaction types, vehicle identifier (e.g. license plate number, make and model, color, etc.), type of user category of parking transaction, options available to users to satisfy the parking obligations, a default retrieval amount of time to perform a retrieval of the vehicle, the number of parking provider employees available to provide service to the parking transaction, a very important person (VIP) flag or indicator, or customer obligation status (e.g. satisfied or unsatisfied), among other things The transaction data 227 may include information related to the parking customer. The transaction data 227 may be modified after the transaction has started. The transaction data 227 may be modified during the parking transaction. The transaction data 227 may be modified after the customer has turned control of the vehicle over to the parking provider. The transaction data 227 may include data associated with the real-time status of the parking transaction.

The transaction data 227 may be modified during the parking transaction. In some embodiments, the transaction data 227 is automatically modified by the parking event server 224. The transaction data 227 may be change throughout a parking transaction to reflect the real-time status of the parking transaction. For example, if a customer completes a payment using the first electronic device 210, the transaction data 227 may be modified to reflect the customer's obligation related to the parking transaction has been satisfied. For example, the first electronic device 210 may directly or indirectly transmit or cause to be transmitted an obligation satisfied confirmation or payment receipt to the parking event server 224. The parking event server 224 would then modify the transaction data 227 to reflect that the customer's obligation has been satisfied. Similarly, if the customer submits a request to the parking event system 220 for his or her vehicle to be retrieved, the transaction data 227 would be modified to indicate that such a request has been made.

Transaction Identifier Data—

The transaction identifier data 230 may include encoded data. The transaction identifier data 230 may be a computer readable medium. The transaction identifier data 230 may be affixed to or printed on a tangible medium such as but not limited to a plastic or a paper-based material. The transaction identifier data 230 may be displayed on an electronic display. In one embodiment, the transaction identifier data 230 has been printed on a parking slip associated with a parking transaction. In one embodiment, the transaction identifier data 230 is an RFID or NFC signal.

The transaction identifier data 230 may include the information included in the address data 222. The transaction identifier data 230 may be in a form that may not be readily understood by the first electronic device 210. Thus, an electronic device such as the first electronic device 210 may decode the transaction identifier data 230 to decode or convert it into a different form in order to obtain the electronic address data 222. It is understood that decoding or converting from the transaction identifier data 230 to the address data 222 may be accomplished by the first electronic device 210 or by another system accessible to the electronic device 210. A decoding system may be accessible to the first electronic device 210 via a network.

The first electronic device 210 may store the transaction identifier data 230 in its storage. The electronic device 210 may be configured to make available the stored transaction identifier data 230 in a human readable form or a machine readable form. In one embodiment, the transaction identifier data 230 includes a 2-d barcode. The first electronic device 210 may photograph or otherwise optically capture the 2-d barcode, which is stored in the storage of the first electronic device 210. The first electronic device 210 may display the stored 2-d barcode on a display. In one embodiment, the transaction identifier data 230 is displayed on the display of the first electronic device 210. The second electronic device 213 receives the transaction identifier data 230 by the second electronic device 213 using the attached imaging device. The second electronic device 213 may store the received transaction identifier data 230 in the storage of the second electronic device 213.

Address Data—

The address data 222 includes information on the location of the parking event system 220. The electronic address data 222 may be contained upon or within a computer readable media. The address data 222 may be associated with a unique parking transaction. In some embodiments, the address data 222 may be reused. In one embodiment, the address data 222 is associated with a first parking transaction. When the first parking transaction has been completed, the address data 222 may then be used in a second parking transaction.

The address data 222 may include information on the location of the transaction data 227 relative to the parking event storage 226. The address data 222 may include the address of the parking event server 224. The address data 222 may include a Universal Resource Locator (URL), which could be understood and/or used by the first electronic device 210 to locate the parking event system 220. The address data 222 may be used by the first electronic device 210 establish path 214. The electronic address data 222 may include an index associated with the transaction data 227.

The first electronic device 210 may use the address data 222 to locate the parking event system 220. The address data 222 may include the location associated with the parking event system 220 relative to one or more networks. In one embodiment, the address data 222 may be associated with the location of the parking event system 220 relative to a local area network (LAN) or a broader network such as, but not limited to, the Internet.

Parking Event Server—Transaction Data—

The parking event server 224 may be configured to manage access to the transaction data 227. The parking event server 224 may be configured to associate an access level to the first electronic device 210. The access level determines to what extent the transaction data 227 is available to the first electronic device 210. The access level of the first electronic device 210 may determine whether the first electronic device may modify the transaction data 227. In some embodiments, the ability to modify parameters such as price may only be permitted by devices associated with threshold access level. In some embodiments, the ability to modify the transaction data 227 to reflect that the customer's obligation has been satisfied may only be performed by devices having a threshold access level.

The parking event server 224 may associate the unique identifier of the first electronic device 210 with an access level to the transaction data 227. The association between the unique identifier of the first electronic device 210 and an access level may be stored in the parking event storage 226. The association between the unique identifier of the first electronic device 210 and the access level may be stored in the transaction data 227. In one embodiment, the first electronic device 210 communicates the first key to the parking event system 220. The parking event server 224 may determine the access level to associate with the first electronic device 210 and the transaction data 227 based on the received first key. In one embodiment, the parking event storage includes a list of unique identifiers. The unique identifiers are associated with electronic devices. If the unique identifier of the electronic device such as, but not limited to, the first electronic device 210 is included in the list, then the parking event server 220 associated with the electronic device with an access level. In one embodiment, the first electronic device 210 communicates the unique identifier of the first electronic device 210 to the parking event system 220. Based on the received unique identifier, the parking event server 224 determines the appropriate access level. In some embodiments, the list of unique identifier includes all electronic devices used by a parking provider.

The parking event server 224 may be configured to process information related to the parking transaction. The parking event server 224 may use the transaction data 227 to determine information related to the parking transaction. For example, the parking event server 224 may calculate the cost of the parking transaction at a specified time based on the transaction data 227. The parking event server 224 may calculate the cost of the parking transaction by multiplying a rate by the amount of time associated with a transaction. The start time may be provided by the parking event server 224 or the electronic device 210. The parking event server 224 may store the then-current cost of the parking transaction in the transaction data 227 or the parking event storage 226. In some embodiments, the cost of the parking transaction is communicated to the first electronic device 210.

The transaction identifier data 230 may be in a form not readily understood by humans. In some embodiments, the transaction identifier data 230 may be in a form readily understood by the first electronic device 210 to refer to the address data 222. The transaction identifier data 230 may need to be converted or decoded to a different form in order to obtain the address data 222. In some embodiments, the transaction identifier data 230 may be in human readable form. For example, the transaction identifier data 230 may comprise letters, number, or symbols readily understood by humans. A user may input the transaction identifier data 230 into the first electronic device 210. The first electronic device 210 may need to decode the transaction identifier data 230 into the address data 222.

In some embodiments, the transaction identifier data 230 may include encoded data such as, but not limited to, a 1-D bar code, 2-D bar code, QR code, RFID, NFC. In some embodiments, the first electronic device 210 decodes the transaction identifier data 230 into the electronic address data 222.

Figure 2:
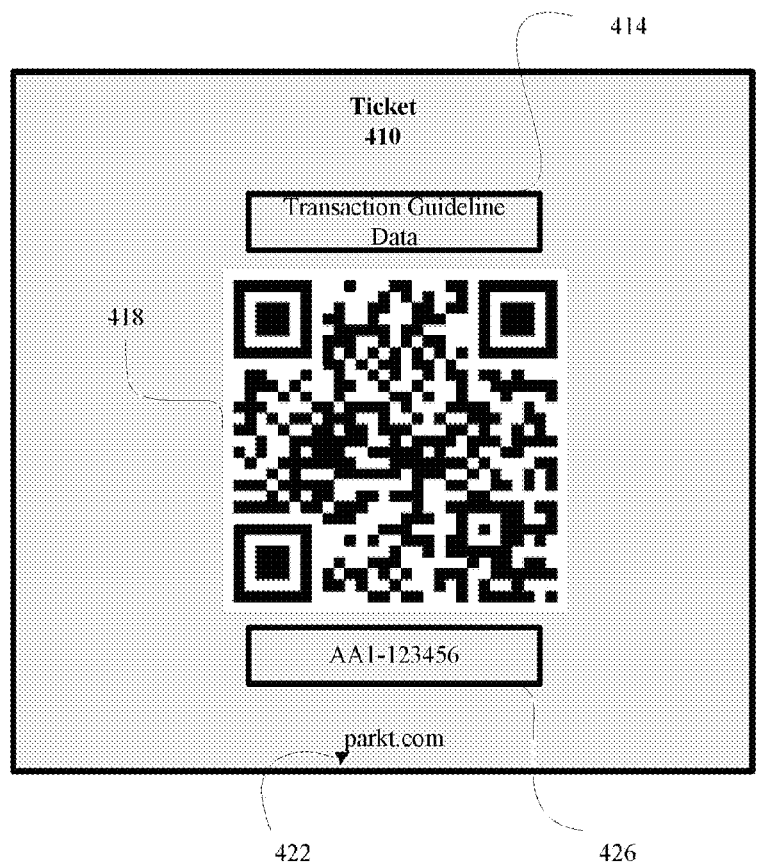
FIGS. 2 and 3 illustrate embodiments of encoded tokens in the form of transaction data identifiers represented as a QR code intended to be printed on a paper ticket according to some of the inventive principles of this patent disclosure.
Figure 3:
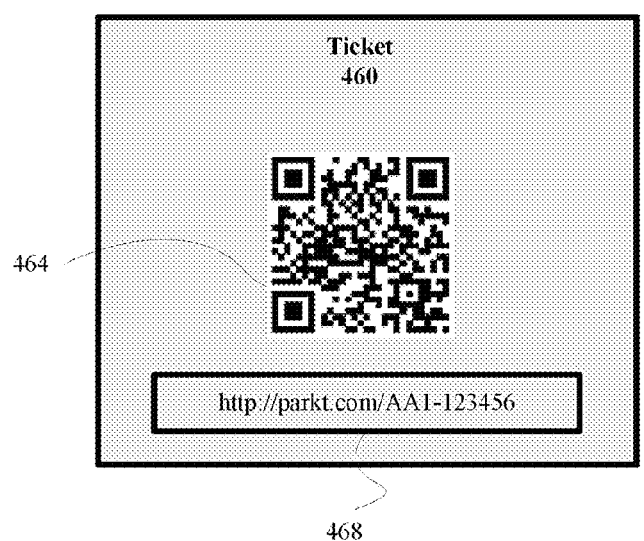

In some embodiments, the transaction identifier data 230 may be printed on or affixed to a material. For example, the transaction identifier data 230 may be printed on a paper parking slip, ticket or transaction receipt associated with a parking transaction. FIGS. 2 and 3 depict various types of tickets. Referring to FIG. 2, a ticket 410 is presented. The ticket 410 may include transaction guideline data 414, parking event server address data 422, index data 426, and transaction identifier data 418. The transaction identifier data 418 includes a QR code. The transaction identifier data 418 is associated with a parking transaction. An electronic device such as, but not limited to, the first electronic device 210 may decode the transaction identifier data 418 into the electronic address data 222. The electronic device may receive the transaction identifier data 418 from an optical imaging device such as a camera. The transaction identifier data 418 may be stored in the storage of the electronic device. After storing, the electronic device may decode the transaction identifier data 418 into the electronic address data 222. The electronic device may use address data 222 to establish communications with the parking event system 220. Transaction guideline data 414 may include information such as, but not limited to, price, parking rules, park zone location, transaction number or contact information for the parking provider.

Referring to FIG. 3, a ticket 460 is shown. The ticket 460 includes transaction identifier data 464. Transaction identifier data 464 may be decoded to the electronic address data 222 by an electronic device such as, but not limited to, the first electronic device 210. The ticket 460 includes parking event location data 468. Parking event location data 468 may be manually entered by a user of an electronic device that is not equipped with optical imaging device, is malfunctioning, or is otherwise unable to receive, store, or decode the transaction identifier data 464. The user may manually enter the parking event location data 468 using a keyboard or other human interface device.

The parking slip may be generated prior to the parking transaction. In one embodiment, a parking provider generates a plurality of parking tickets prior to the occurrence of any parking transactions. The parking tickets are then issued to customers that request a parking transaction. In one embodiment, the parking slips may be generated from a printer attached to the electronic device 210. In one embodiment, the parking slip is generated by a parking management system. The parking slip may include other data related to a parking transaction such as the transaction start time, address, price, or parking procedure information such as the payment procedure or hours of operation related to the parking transaction. This other information related to the parking transaction may include encoded data.

The form of the transaction identifier data 230 may be based on the potential users of the transaction identifier data. For example, a 2-D barcode may be used for the transaction identifier data 230 instead of alpha numeric characters when it is expected that the transaction identifier data will be scanned and used by an electronic device because a 2-D barcode is likely easier for a machine to read and receive thereby reducing errors. Similarly, if a person is expected to read and/or use the transaction identifier data 230 directly, it may be desirable for the transaction identifier data 230 to be encoded in alpha numeric characters which is likely easier for the person to input using a keypad or other input device. Other coding formats may be utilized that facilitate accurate and reliable reading of the transaction identifier data 230 by a machine such as the electronic device 210. It may be desirable for the transaction identifier data 230 to be in a form understood by humans in case the electronic device 210 is an older device or is malfunctioning.

The electronic device 210 may receive the transaction identifier data 230 over the communications path 218. In some embodiments, the communications path 214 may be through an optical imaging device. For example, the electronic device 210 may receive the digital image of encoded data through an optical imaging device such as a digital camera or scanner. In one embodiment, the electronic device 210 receives the digital image of the transaction identifier data 230.

After the transaction identifier data 230 is received by the first electronic device 210 the transaction identifier data 230 may be stored and/or displayed on the first electronic device 210. Additionally, any encoded data included in the transaction identifier data 230 may be decoded to one or more forms. The transaction identifier data 230 is decoded from a QR code printed on a parking slip to a computer readable medium form that may be used by the electronic device 210 to locate the relevant parking event corresponding to a parking slip or ticket. The transaction identifier data 230 may be decoded to electronic address data 222. In some embodiments, the transaction identifier data 230 may be decoded to the first key corresponding to an access level.

The first electronic device 210 may have a decoding module for decoding encoded data associated with the transaction identifier data 230. In one embodiment, the first electronic device 210 may transmit the encoded data to another device or system equipped with a decoding module. The other device may decode the transaction identifier data 230 and transmit the transaction identifier data 230 in one or more decoded forms to the first electronic device 210. Utilizing another device for decoding transaction identifier data 230 may be useful if the first electronic device 210 is an older model lacking adequate hardware or computing resources to decode the transaction identifier data 230. The personal computing device 210 may receive the decoded transaction identifier data 230 from a device equipped with a decoding module. The transaction identifier data 230 may be stored and/or displayed by the first electronic device 210. The transaction identifier data 230 has been decoded, it may be displayed on the display of the electronic device 210 in its decoded form.

The electronic device 210 may automatically initiate communications with a parking event system 220. The communications may be initiated once the transaction identifier data 230 is received or stored, and is in a format understood by the electronic device 210. The first electronic device may automatically initiate communications if the first electronic device enters the park zone 202 based a positioning module or device included or communicatively coupled to the electronic device 210. The positioning module or device may be a GPS receiver.

The first electronic device 210 may also initiate contact with the parking event system 220 upon the user of the electronic device 210 selecting or entering an instruction. Such a command may be inputted or selected by a person using the electronic device 210. Upon successful initiation of communications between the electronic device 210 and the parking event system 220, the first electronic device 210 may be communicatively coupled with the parking event over communications path 214. Data may be exchanged between the first electronic device 210 and the parking event system 220. Data may be transmitted from the first electronic device 210 to the parking event system 220. Data may be transmitted from the parking event system 220 to the first electronic device 210.

In some embodiments, the first electronic device 210 and the parking event 220 may establish communications periodically during a parking transaction. It may be desirable to avoid communicative coupling to minimize the computing resources and power consumption of the electronic device 210 and/or parking event system 220. Thus, communicative coupling between electronic device 210 and the parking event system 220 may be paused and subsequently re-established.

The parking event system 220 may associate received data with the particular electronic device 210 that transmitted the data. The association may be done by using, for example, a username from a user associated with the electronic device, an email address of the user of the electronic device 210, the Internet Protocol (IP) address of the electronic device 210, or the MAC address or electronic device 210 or a combination thereof. The association of the data may be accomplished any identifier that uniquely identifies the electronic device 210. The parking event system 220 may associate received data with a username associated with the user of the electronic device 210 that transmitted the data. The association of the data with the electronic device 210 may allow for easier subsequent access to transaction data 227.

In some embodiments, the transaction identifier data 230 received by the first electronic device 210 may be transmitted to the parking event system 220. If the transaction identifier data 230 is transmitted to the parking event system 220, the parking event server 224 may decode the transaction identifier data 230. The parking event server 224 may then transmit the decoded data to the electronic device 210. The display may be in the same manner as if the user electronic device performed the decoding and display functions. This option may be used if the electronic device 210 does not have the capability to decode the data itself, such as if the electronic device 210 lacks the capabilities of decoding a particular form of the transaction identifier data 230. The decoded data transmitted from the parking event server 224 to the electronic device 210 may also be stored on the electronic device 210.

The parking event server 224 may modify the transaction data 227. Modification of the transaction data 227 may be done automatically by the parking event system or presented as a display choice on the first electronic device 210 for the user to select.

The user of the electronic device 210 may also initiate contact with the parking event system 220 to retrieve data associated with a parking transaction. Upon establishment of communication with the parking event server 224, the data may be transmitted from the parking event server 224 to the electronic device 210 for display to the user. The data may also be stored upon the electronic device 210 after it is received from the parking event server 224. The contact with the parking event server 224 and the transmission of data from the parking event server 224 to the electronic device 210 may occur over path 214.

An electronic device, such as but not limited to, the first electronic device 210 may be used to request data from the parking event system 220. If the electronic device is associated with the appropriate access level, the parking event server 224 will transmit the requested data to the first electronic device. In one embodiment, the user of the first electronic device 210 requests retrieval option data for the vehicle from the parking event system 220. The retrieval option data may be located in the transaction data 227. The parking event system 220 processes the request and transmits the retrieval option data to the first electronic device 210. The first electronic device 210 may receive the retrieval option data. The first electronic device 210 may store the retrieval option data. The retrieval option data associated with one or more retrieval options may be displayed on the display of the first electronic device 210. The user selects a retrieval time by touching the corresponding portion of the screen. The selected retrieval time may be transmitted from the first electronic device 210 to the parking event system 220. The parking event system 220 may transmit an alert containing the retrieval data to all electronic devices associated with the transaction data 217. The user of the first electronic device 210 may be able to cancel the retrieval request by submitting a cancellation request to the parking event system 220. If the parking provider retrieves the vehicle, but the vehicle is not retrieved by the customer from a load zone, the vehicle may be moved from load zone and parked by the parking provider.

Figures 4, 5:
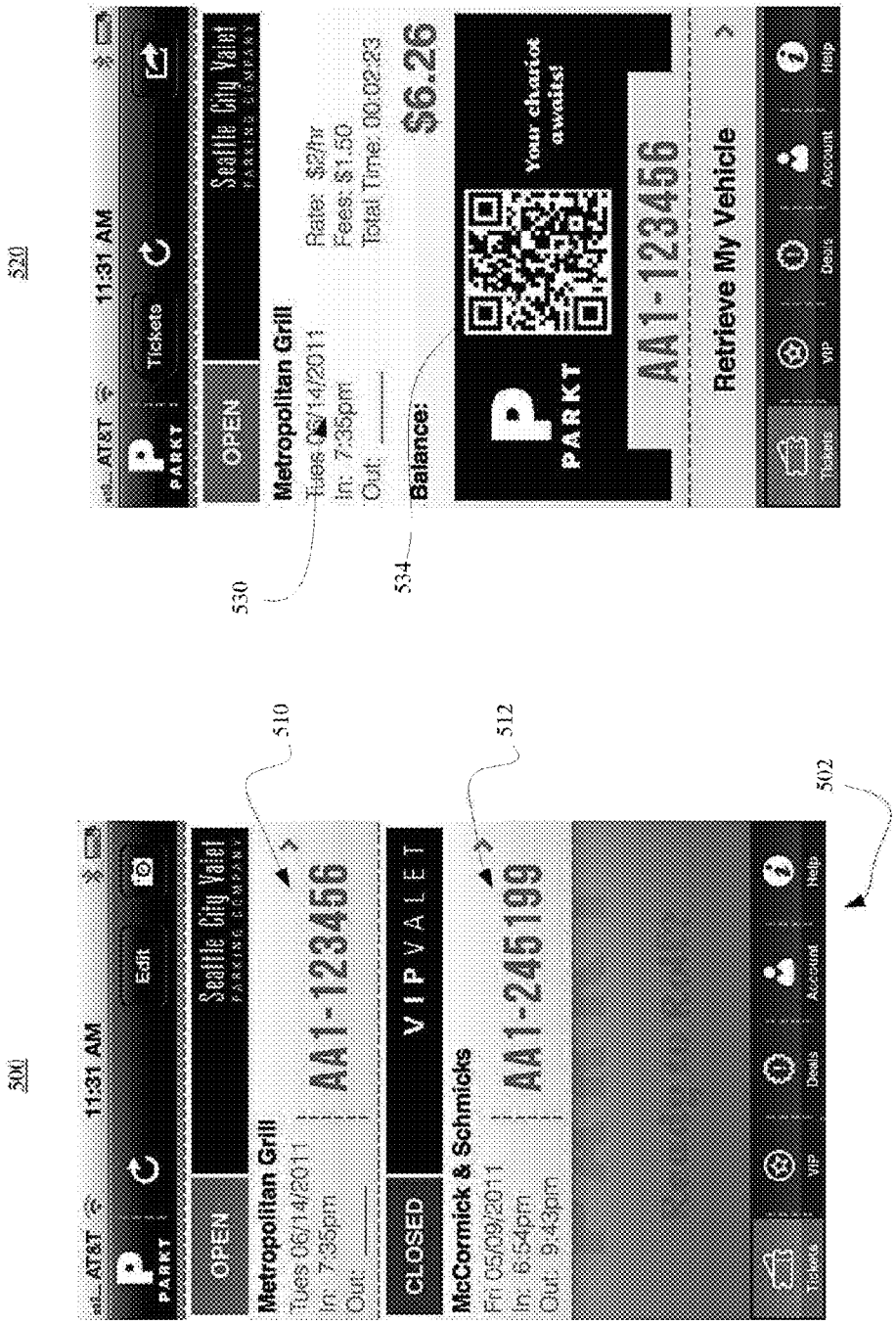
FIG. 4 depicts a user interface that displays a listing of transactional data identifiers, each referencing different datasets but belonging to a single account according to some of the inventive principles of this patent disclosure.
FIG. 5 depicts a user interface that displays some of the dataset belonging to a single transactional data identifier according to some of the inventive principles of this patent disclosure.

FIGS. 4, 5, 6 and 7 depict screenshots of a user interface displayed on an electronic device such as, but not limited to, the first electronic device 210. Referring to FIG. 4, a user interface 500 is shown. User interface 500 may include selection panel 502, first index data 510, and second index data 512. If an option on the selection panel 502 is selected, the electronic device may transmit the selection to the parking event system 220. First index data 510 is data associated with a parking transaction. Second index data 512 is data associated with a parking transaction. First index data 510 is designated as open. The open designation indicates that the parking transaction has not been completed. Second index data is designated as closed. The closed designation indicates that the parking transaction has been completed. The first index data 510 and the second index data 512 may be used to identify the transaction data associated with the parking transactions.

Referring to FIG. 5, a user interface 520 is shown. User interface 520 may include transaction information 530 and transaction identifier data 534. Transaction information 530 may include a time in, time out, rate, fees, total time, among other things. Transaction information 530 may be based on the transaction data 227 transmitted from the parking event system 220 to the electronic device. Transaction identifier data 534 includes a QR code. The QR code included in the transaction identifier data 534 may be decoded to electronic address data, which would allow the electronic device to locate a parking event system associated with a parking transaction. Transaction identifier data 534 may also be received by another electronic device by using a camera or other optical imaging device of the other electronic device.

Figure 6:
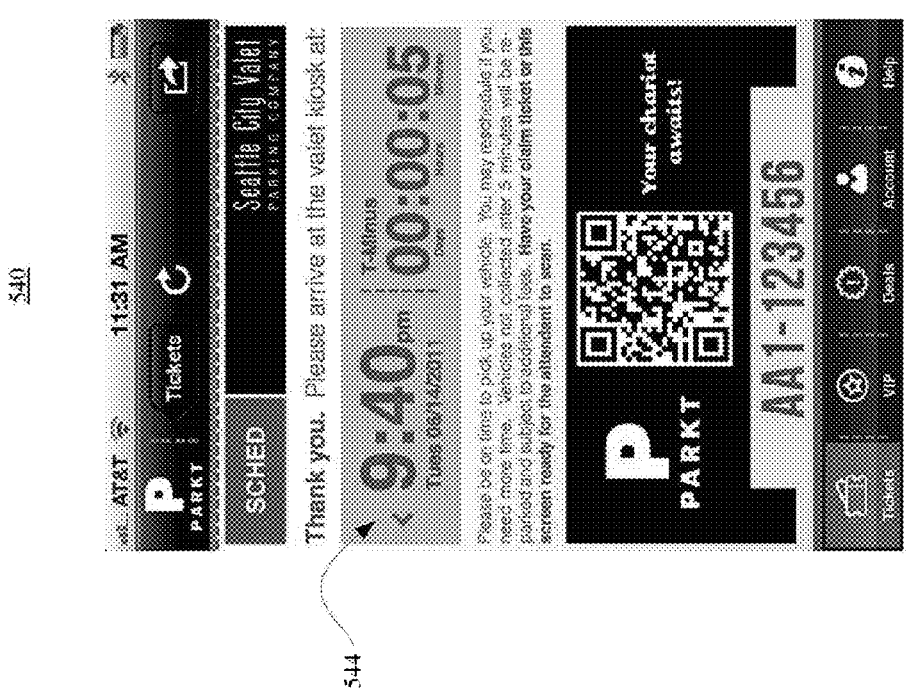
FIG. 6 depicts a user interface that displays a delivery confirmation time assigned to a transactional data identifier according to some of the inventive principles of this patent disclosure.

Referring to FIG. 6, a user interface 540 is shown. User interface 540 may include retrieval timer 544. The retrieval timer 540 represents an estimated time until the vehicle will be available to the customer at a load zone or other retrieval area. Estimated retrieval times may be based on factors. The factors may be stored in the transaction data 227. The factors may include the number of employees available to provide retrieval services, the number of parking transactions occurring at a given park zone, a VIP customer associated with the transaction, the typical retrieval time, the historical retrieval time or combinations thereof, among other things. The factors used to determine retrieval times may be stored in the transaction data 227. The time value displayed on retrieval time 544 may correspond to an estimated retrieval time minus the time surpassed since the retrieval was requested. The time value displayed on retrieval time 544 may correspond to a requested retrieval time minus the time surpassed since the retrieval was requested.

Figure 7:
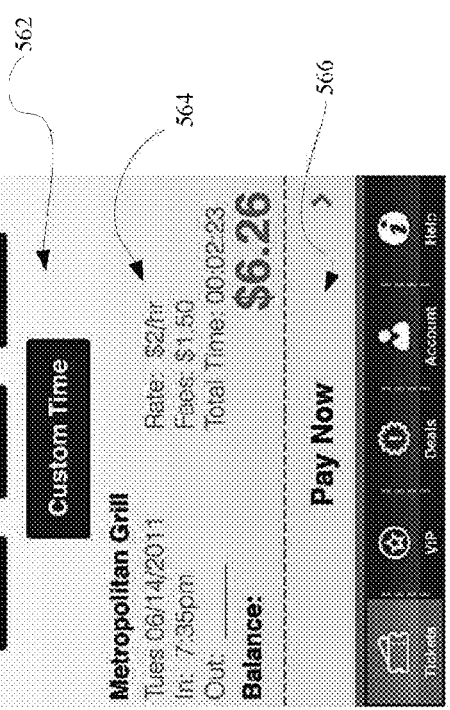
FIG. 7 depicts a user interface that displays a set of delivery times available for assignment to a transactional data identifier as well as balance and payment button to execute transaction processing according to some of the inventive principles of this patent disclosure.

Referring to FIG. 7, a user interface 560 is shown. User interface 540 may include retrieval options buttons 562 and payment options button 566, and transaction information 564. Retrieval options buttons 562 may correspond to retrieval times. Retrieval times may be determined as discussed above in relation to FIG. 6. Clicking the ASAP button will request that the parking event system 220 add the ticket to next available time slot in the next available five minute block of time. Clicking ASAP may provide a retrieval timer based on the estimated retrieval time for the ASAP button. Transaction information 564 displays the date, time in, time out, rate, fees, total time, and balance. Transaction information 564 is based data received from the parking event system 220. If selected, payment option button 566 will transmit a request to the parking event system 220 for payment options.

Figure 8:
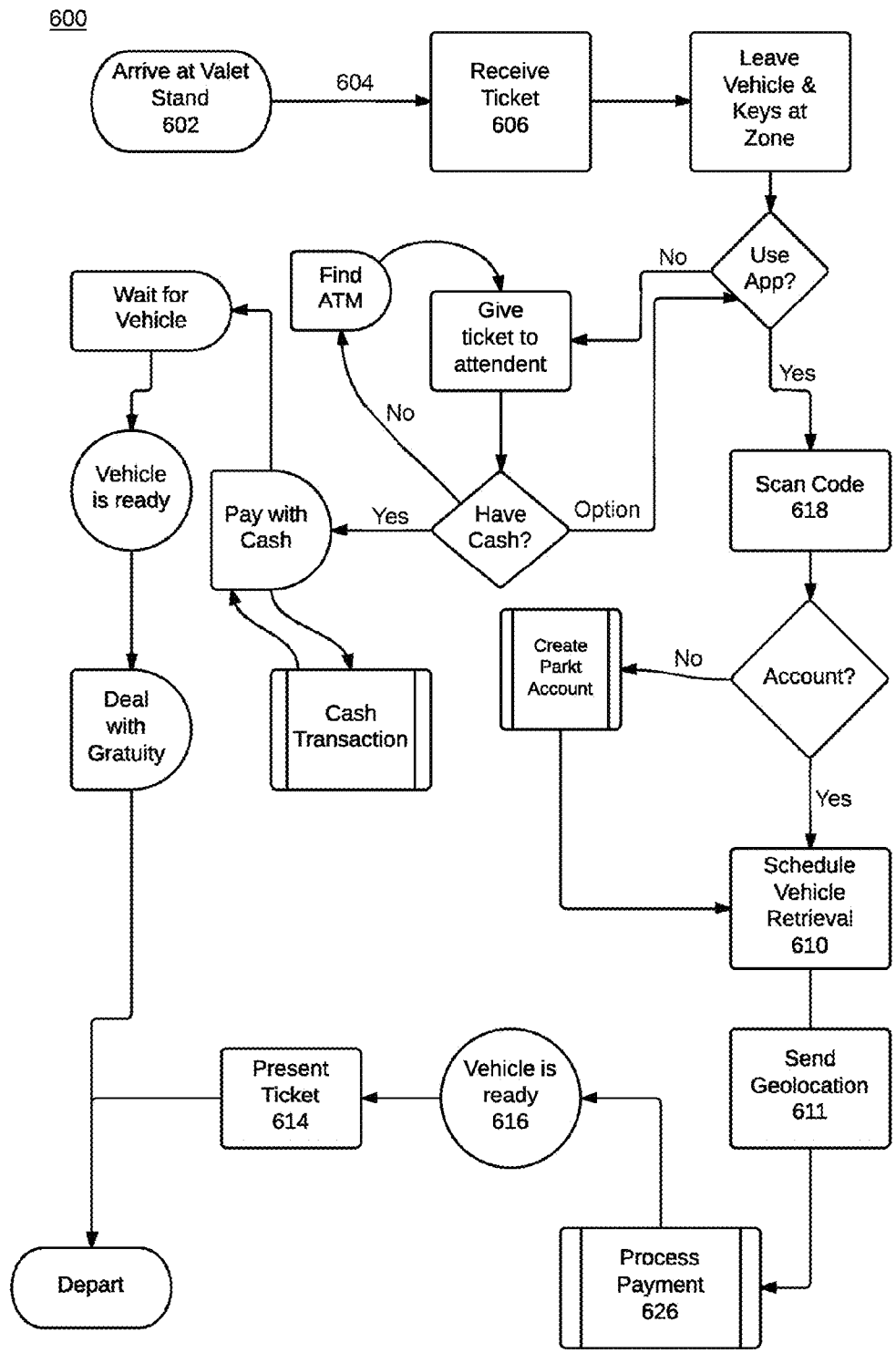
FIG. 8 is a flow diagram illustrating how a driver might interact with a valet parking embodiment of the parking system according to some of the inventive principles of this patent disclosure.

FIG. 8 depicts a flowchart of a method in accordance with an exemplary embodiment. Exemplary method 600 is provided by way of example, as there are a variety of ways to carry out the methods disclosed herein. The method 600 as shown in FIG. 8 may be executed or otherwise performed by one or a combination of various systems. The method 600 may be used in a valet parking service, parking lot, street parking or garage parking. The method 600 is described below is carried out on an exemplary system as shown in FIGS. 1-7. Each block shown in FIG. 8 represents one or more processes, methods, or subroutines carried out in the exemplary method 600.

At block 602, a vehicle has been left in the park zone 202. The vehicle may be placed in the park zone 202 by a customer to a parking transaction or provider of the parking service associated with the parking transaction. The vehicle may remain in the park zone 202 or it may be moved from the park zone 202 to another location by the parking provider if the park zone 202 is an unload zone. At block 604, the parking event system 220 may be initialized. The parking event system 202 may be initialized when the second electronic device 213 or another electronic device with a threshold access level initiates communication with the parking event system 220. At block 606, the transaction identifier data 230 is presented to the customer. The transaction identifier data 230 may be presented via ticket or an electronic display, or an RFID or NFC transmitter among other things. The transaction identifier data 230 may need to be decoded before it may be understood by the electronic device 210. At block 618, the customer may establish communication with the parking event system 220 using the transaction identifier data. At block 618, the customer may select a vehicle retrieval request using the electronic device 210, which is communicated to the parking event system 220. The parking event system 220 then transmits the retrieval request information to an electronic device associated with retrieval. The instructions used to contact the electronic device associated with retrieval may be in the transaction data 227. The electronic device associated with retrieval will alert the staff to the retrieval request. At block 626, the customer completes payment using the electronic device 210 or otherwise satisfies customer parking transaction obligation related to the parking transaction. Customer may satisfy customer parking transaction obligation by obtaining validation either by entering a validation code which is then indicated in the transaction data 227 or by allowing a provider of validation to scan. Various systems and methods disclosed herein may be used to update transaction data 227 to reflect that the customer parking transaction obligation has been satisfied. At block 626, payment is verified. In some embodiments, payment is verified by the scanning of the ticket by the parking provider using an electronic device configured to communicate with the parking event system 220 having parking provider credentials. At block 614, the parking event session is ended. The parking event session may be ended if no customer communications have occurred regarding the transaction data 227. For example, when the parking event session is ended the transaction identifier data 230 may no longer be valid to obtain transaction data 227. At block 616 the vehicle is returned to the customer. Alternatively, exemplary method 600 may provide an alternative when the communication is not established between an electronic device and the parking event system 220. At block 608 the customer requests retrieval of the vehicle in-person to a parking staff. At block 610, the parking staff retrieves the vehicle. At block 612, the parking provider staff processes in-person the customer parking transaction obligation. Block 612 may occur after a customer has initiated a requested using the electronic device. For example, the parking transaction staff takes payment from the customer, validates the transaction, or verifies validation provided by another entity such as a restaurant patronized by the customer.

Figure 9:
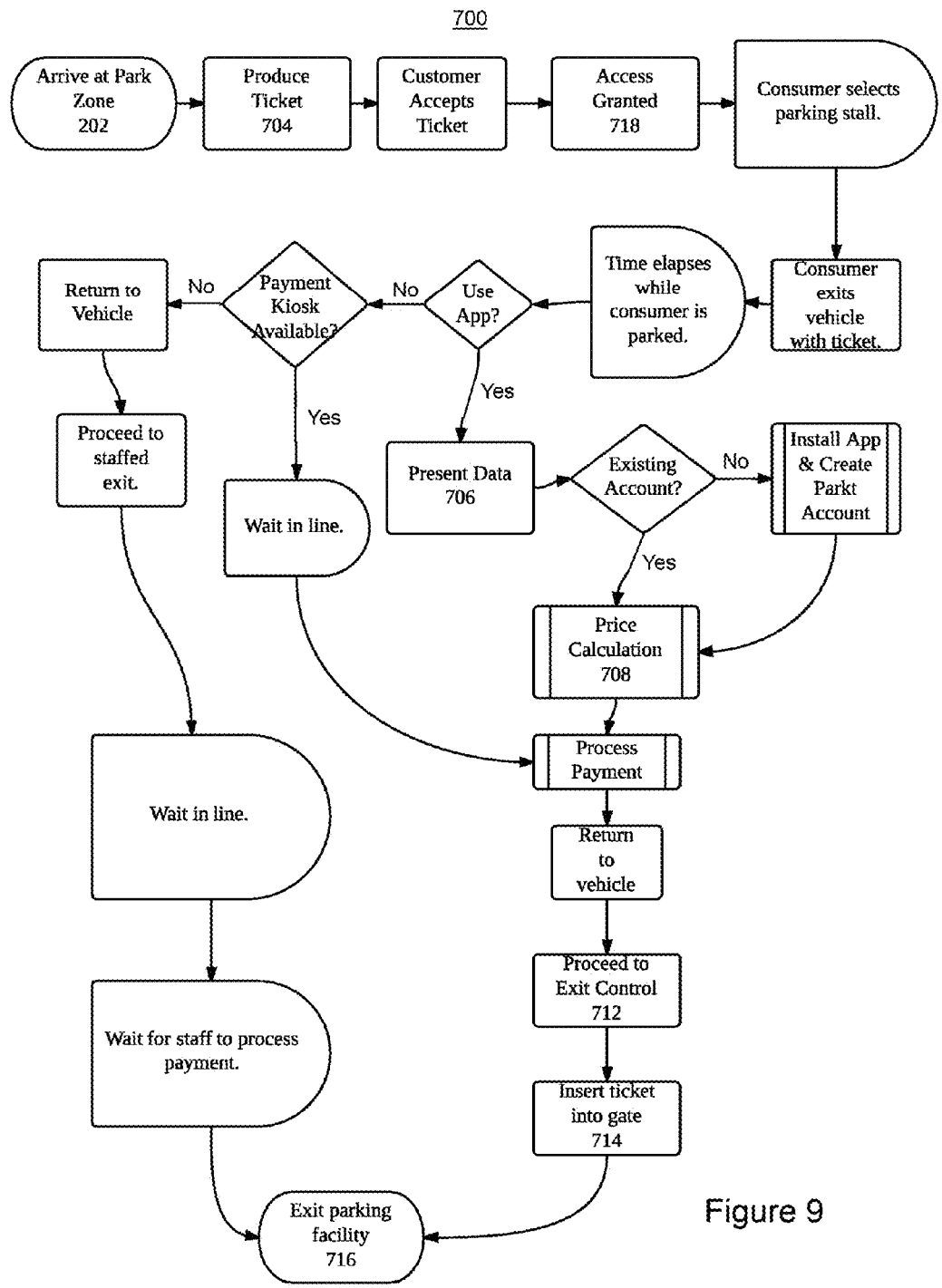
FIG. 9 is a flow diagram illustrating how a driver might interact with a parking garage embodiment of the parking system according to some of the inventive principles of this patent disclosure.

FIG. 9 depicts a flowchart of a method in accordance with an exemplary embodiment. Exemplary method 700 is provided by way of example, as there are a variety of ways to carry out the methods disclosed herein. The method 700 as shown in FIG. 9 may be executed or otherwise performed by one or a combination of various systems. The method 700 may be used with garage or parking service. The method 700 is described below is carried out on an exemplary system as shown in FIGS. 1-8. Each block shown in FIG. 9 represents one or more processes, methods, or subroutines carried out in the exemplary method 700.

At block 702 a vehicle enters the parking zone 202. The vehicle may be driven by a customer, valet or otherwise be moved into the park zone 202. At block 704, a slip is issued related to a parking transaction. The slip includes transaction identifier data 230. The slip may be issued by a parking provider handing a slip to the customer. The slip may be issued by a parking management system dispensing a slip to the customer. The slip includes transaction identifier data 230. The transaction data 227 associated with the transaction identifier data 230 may not be specified at the time the slip is provided to the customer. In some embodiments, the transaction identifier data 230 is specified after the slip is issued. At block 718, the transaction data 227 is modified or configured by one or more electronic devices such as, but not limited to, the first electronic device 210 and the second electronic device 213. The transaction data 230 may be modified or configured by changing the transaction type data of the transaction data 217 to reflect one of a valet, parking lot, parking garage, or VIP transaction. The transaction data 230 may be modified by or configured by setting a price. The transaction data 230 may be modified by or configured by selecting a transaction time. In some embodiments, the transaction data 230 may be modified by a user of an electronic device 210 with a threshold access level. In some embodiments, the transaction data 227 may be modified by the customer after the customer is in possession of the slip. In some embodiments, the parking provider updates the transaction type data of transaction data 227. This allows the parking provider and the customer to customize the parking transaction by modifying the transaction data 227 after the parking transaction has begun.

At block 706, the slip is presented to a parking management system. At block 708, the customer obligation associated with the parking transaction is calculated. The obligation may be calculated by a parking management system or the parking event system 220. The customer obligation associated with a parking transaction may refer to a parking fee or validation requirement. At block 710, the customer satisfies the obligation for the parking transaction by making payment using the electronic device. Payment may be completed through a parking management system or made in-person to a parking provider. At block 712, the vehicle approaches the exit of the park zone 202. At block 714, the customer obligation is verified. At block 716, the vehicle is permitted to leave the area. The vehicle may be permitted to leave the area by a gate being lifted or a barrier being removed thereby allowing the vehicle to exit the park zone 202.

Figure 10:
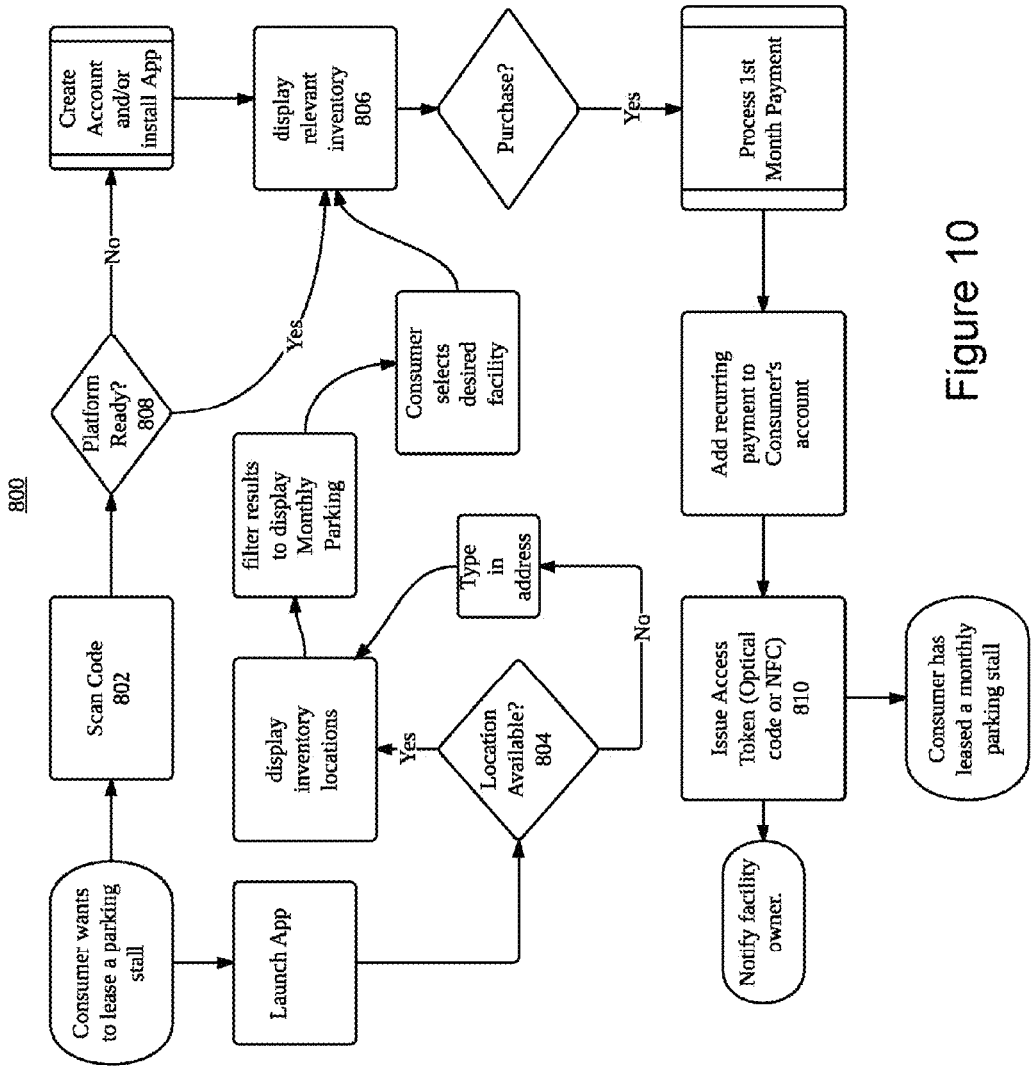
FIG. 10 is a flow diagram illustrating how a driver might interact with a leased parking embodiment of the parking system according to some of the inventive principles of this patent disclosure.

FIG. 10 depicts a flowchart of a method in accordance with an exemplary embodiment. Exemplary method 800 is provided by way of example, as there are a variety of ways to carry out the methods disclosed herein. The method 800 as shown in FIG. 10 may be executed or otherwise performed by one or a combination of various systems. The method 800 may be used with garage or parking service. The method 800 is described below is carried out on an exemplary system as shown in FIGS. 1-9. Each block shown in FIG. 10 represents one or more processes, methods, or subroutines carried out in the exemplary method 800.

At block 802, transaction identifier data 230 may be received by an electronic device. Various methods of receiving the transaction identifier data may be utilized as mentioned above. At block 804, the transaction identifier data may be decoded into electronic address data 222 and/or index data 228 by the electronic device. At block 806 the electronic device directs communication to the parking event system 220 based on the electronic address data 222 and/or the index data 228. At block 808 the parking event system determines communicates instructions for the user to obtain the preferred application compatible with the electronic device. The instructions may be presented on the display of the electronic device to the user of the electronic device. Block 808 occurs if the parking event system 220 determines the electronic device is not equipped with a preferred application. The preferred application may be an app well-suited to performing the steps of the present invention. In some embodiments, the electronic device is an Apple portable electronic device running on iOS and the preferred application may be a specific app available in the iTunes store.

At block 810, the electronic device 210 communicates a data token to the parking event system 220. At block 812, the parking event system 220 authenticates the data token and associates an access level to the electronic device. The access level associated with the electronic device may be based on the token. The access level is stored in the parking event storage 226. The access level may be stored in the transaction data 227. The access level associated with the electronic device determines the amount and type of transaction data 227 that will be available to the electronic device. At block 814 the electronic device transmits a request for data from the parking event system 220. It is understood that some or all of blocks 808, 810, and 814 may be transmitted at substantially the same time or in different sequences. At block 816, the parking event system 220 responds to the request for information by transmitting the requested data consistent with the access level to the requesting electronic device.

Figure 11:
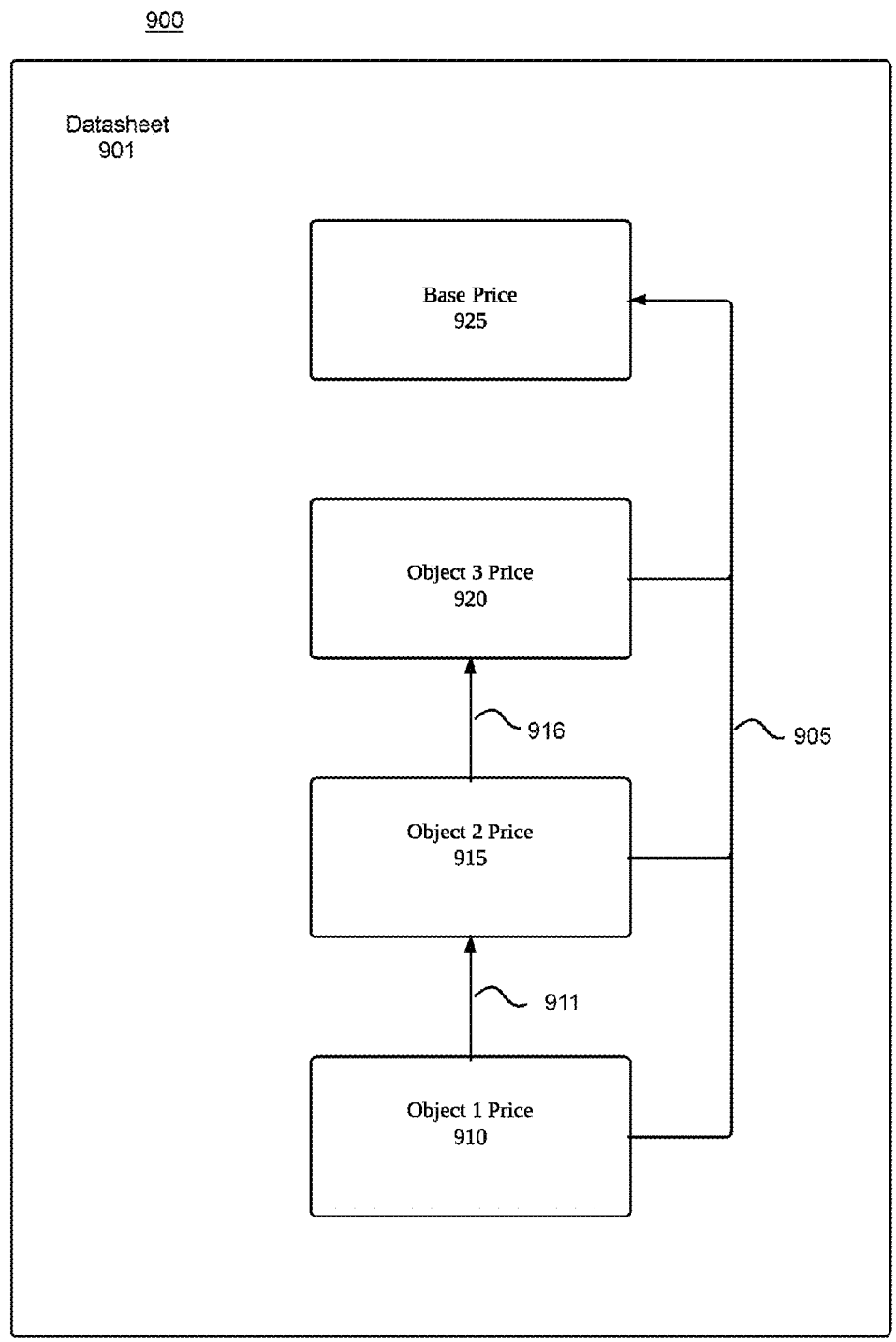
FIG. 11 illustrates an embodiment of a fee structure that makes up a part of the dataset referenced by a transaction data identifier according to some of the inventive principles of this patent disclosure.

FIG. 11 shows a block diagram of an entity listing 900 in accordance with an embodiment of the present invention. The entity listing 900 may include, among other things, a dataset 901 that can include, among other things, a base price 925, an object 3 price 920, an object 2 price 915, and an object 1 price. The base price 925 is modified or replaced if one or more of the other object prices, object 1 price 910, object 2 price 915, object 3 price 920 are present within the dataset 901.

Different types of implementations or hardware and software configurations can be used in the system 200 and the methods disclosed herein. The methods disclosed herein are not limited to any specific hardware/software configuration for the system 200 or any of its components.

With the invention of the automobile came the need to find a place to park it. Finding a space to park that's convenient and affordable is a challenge faced by every driver on the planet. The parking system and technology platform embodied here neatly bypasses this problem, short-circuiting the need for consumers to think about parking and getting them onto the sidewalk or to their destination quickly.

This parking system's approach augments the limited parking inventory of busy commercial and urban areas, unlocking unused capacity that's wasted by poor location, access or restrictions. Consumers skip the chore of searching for a space or wandering through a parking structure and go directly to their destination, where a drop-off zone is ready to receive their car. When it's time to leave, their vehicle is prepaid and waiting curbside, where they left it or wherever they need it to be.

One embodiment of this parking system could constitute a nationwide network of branded operator-licensees who offer the parking system as an exciting and convenient alternative to traditional parking modalities. The parking system's end-to-end solution provides operators with the software tools and cloud-based infrastructure to maximize the efficiency and utilization of any parking facility, to align supply at one location with demand at another, and to offer consumers a seamless, premium pickup & drop-off service that they can control on their smartphone.

The parking system can collect detailed analytics about guests' travel and spending habits at parking system locations, as well as performance metrics about operators and employees. The parking system will know who travels where, when, and for how long. The parking system will also know the moment guests arrive at a given location and know the moment they want to leave. This actionable data will be used to power a realtime engagement platform that will A) provide discovery services to consumers, helping them find places to dine, stay and play and reward loyalty and B) create a marketplace that restaurants, hotels, casinos and others can use to buy or bid on realtime leads. Insurance carriers will value the transparency made available by The Parking System's performance analytics, allowing underwriters to price operator liability coverage more accurately, potentially weeding out problem operators while lowering insurance costs for the safest performers.

For operators, the parking system provides a number of benefits including (1) improving operational efficiencies (i.e., lowering operating and employee costs, increasing parking space utilization, and providing mobile transaction processing), (2) increasing revenue potential by driving more volume or increasing ticket prices for a drop off/pick up service, and (3) increasing customer satisfaction with premium, trusted service. An embodiment that includes easy-to-use smartphone applications provide employees with a simple interface to automate what have historically been manual processes (queue management, damage assessment/claims, employee scheduling, and transaction processing). Rich, real-time data-metrics empower management to monitor every aspect of the business while keeping overhead low. The parking system's likely users are grouped into three primary categories: service providers already running a valet operation looking to improve operational efficiencies, owners of a parking lots or garages looking to improve operational efficiencies and utilization, increase revenue potential, and improve customer satisfaction, and standalone hospitality venues (hotels, casinos, shopping malls, airports, event facilities, etc.) looking to provide a premium service to customers and to increase engagement with them from the moment they arrive to the moment they depart. Users of the parking system will have flexibility to choose where and what type of parking areas to utilize and can fill them to maximum levels. Since consumers will never visit them, these facilities don't need to be consumer friendly, opening up a much larger array of potential inventory than would be available otherwise. Private lots that would go unused after business hours or garages located in inconvenient areas may also be used, further increasing inventory, often at bargain rates.

Various embodiments of the parking system makes it possible to run a parking service at a variety of scales; serving a single small bistro, an entire commercial district, or even the largest hotel casino. Parking system smartphone apps provide a simple on-site interface to powerful back-end systems that provide automated request and queue management, integrated labor management, scheduling, and transaction processing.

Rich data-metrics help keep performance high and overhead low, giving managers the information they need to minimize mistakes and accidents while reducing labor costs. Actionable data from consumers who opt-in can be harvested from parking transactions, allowing the parking system to build detailed consumer profiles that can provide valuable, highly targeted realtime location-based leads for sale to the highest bidder.

For Consumers, the parking system can offer unparalleled convenience and low friction. Consumers simply drop their car at the parking zone serving the business or area they're visiting. At departure, consumers use their smartphone to issue payment of parking fees and summon their vehicle. There are no lines to wait in and their car is brought to them wherever they are, even if they've walked down the street grab a coffee. By using historical data based on stored consumer profiles, the parking system can offer targeted rewards and discovery notifications to influence consumer's decisions and steer them towards offers, events and promotions based on their location and tastes. By reducing friction on both sides of the parking equation and helping to bridge the gap between parking supply and demand, the parking system can improve the way people park.

The vast majority of valet service providers are unplugged, their operations relying on paper tickets and time sheets, cash payments, and honest employees. Even if a manager uses a computer in the office to do the books, only the largest and most high volume valet locations (typically at hotels) have access to electronic tools and POS systems. Managers have no easy means to ensure revenue control, accept credit card payments, or engage with their customers in a meaningful way. Moreover, managers are data-starved, with no way to collect high quality strategic and performance metrics to help them operate efficiently and grow their business. Most partners will achieve savings beyond 15% through risk mitigation, access to analytics, and efficiencies gleaned from consolidation of labor and capacity resources. Assisted or valet only parking facilities that do not allow customers to self-park but instead staff attendants to maximize utilization of their limited space (they may bury a vehicle several cars deep in order to pack the garage absolutely full) would benefit from an embodiment of the parking system. Assisted garages are common in all dense urban cites, employing double or tandem parking techniques or utilizing mechanical lifts to increase capacity.

It is typical for assisted garages to suffer extreme demand spikes during peak hours, which creates painful delays for customers and potentially risky "rush" behavior by employees. The parking system's queue management system, assisted garages have a means to flatten demand spikes and greatly reduce gridlock. Rather than guests arriving at will en masse, they receive a delivery time on their smartphone, allowing them to arrive "just in time" to pick up their car. Reduced gridlock relieves the demand pressure on staff, allowing them to process only as many vehicles as they can safely manage at a time.

Non-prime parking locations or facilities are another candidate an embodiment of the parking system. Here, operators might be struggling to fill their facilities for a variety of reasons (e.g., bad location or intense competition). The parking systems can offer a drop-off/pick-up service as an easy way to win over customers and fill up unused spots. Additionally, a park zone can be located anywhere; not just in front of the facility. For example, a park zone could be on a main street one or two blocks away from the parking facility where there is more exposure to traffic. The non-prime garage can create a "virtual" entrance to their facility at a prime location with nothing more than a few runners, some signage, and the parking system. For prime facilities with peak hour queues, the parking system provides a means to reduce or eliminate bottlenecks (instead of waiting in line to enter a parking facility, a driver can simply drop his/her car off curb-side and walk away).

Parking operators have high fixed costs and are extremely motivated to fill their facilities to maximum levels. Just like hotel rooms and airplane seats, parking inventory is highly perishable, with unfilled parking spots representing a lost revenue opportunity. The parking system's drop-off/pick-up service will attract additional customers looking for premium service and maximum convenience. Additionally, and especially for "non-prime" facilities, park zones can be located offsite to draw in customers from high traffic areas. Standalone valet parking operators can source parking inventory flexibly, using private business lots or other non-traditional "hidden" parking inventory that may less costly and would otherwise go unused. The owner of an office building near a busy entertainment district could monetize their unused parking at night by leasing to a participating parking system operator-partner, with no need to make the lot consumer-friendly, since only parking attendants will be using the space.

As described earlier, existing parking operations are often highly inefficient and lack access to smart technology and rich data. Existing technology products geared towards the parking industry tend to focus on clunky, expensive hardware solutions that incrementally relieve a single pain point here or there, rather than a more holistic approach. Using the parking system, employees and managers are provided with proprietary tools that lower costs and streamline operations by helping to manage labor, consolidate parking inventory, process payments, and monitor (and hence respond to) performance.

Operators gain a competitive advantage if they can offer a consistent, differentiated, high quality service. Premium services attract premium consumers, potentially luring them away from competing, non-premium providers. Moreover, it's possible to charge more for a premium service. However, the parking system's low cost to implement and money-saving features make it possible to offer a premium service without raising rates beyond what the market will bear. Through the use of its technology platform and network, The Parking System captures important data about consumers and their parking and spending patterns. This is especially relevant to Hospitality and Shopping Venues who can integrate this information with their other CRM systems. Operators using The Parking System can strengthen their relationships with nearby or partnered Hospitality and Shopping Venues when they tap into The Parking System's consumer profiling and data collection capabilities. As they become reliant on this data, their need to maintain a longterm relationship with a The Parking System-enabled parking operator grows. With The Parking System's ability to engage and influence consumer behavior in realtime by sending rewards, promotions or notifications in response to behavior, operator-partners could tap into new sources of revenue by selling access to these systems to relevant restaurants, hotels, nightclubs or other businesses in the vicinity of their parking operations, whose customers utilize their parking services.

Operators can greatly reduce risks of theft, fraud and accidents by using The Parking System. The Parking System's revenue control features, demand normalization, vehicle condition logging and performance monitoring features can greatly reduce the risks faced by parking operations every day. In the future, The Parking System may be able to offer a reduced rate liability insurance program exclusively to its network of licensees.

Self-parking in a crowded garage or parking lot can be a time consuming and stressful experience. Consumers must decide which facility to use, locate the entrance, navigate through maze-like rows of vehicles to find a spot, figure out how the payment system works (do I take my ticket with me or leave it in my car?), locate the exit and remember where they left their vehicle so they can find it again. All of this can add minutes (and sometimes even hours) to a trip. Traditional valet parking can offer a better experience than self-parking, but is plagued by its own set of serious downsides: is valet even available? is the operator trustworthy? will they take good care of my vehicle? do they only accept cash? how much should I tip? how long will I have to wait around in the rain for them to bring my car back? What if there's a long line? The Parking System delivers on the promise of convenience offered by traditional valet parking while making the process seamless, trustworthy and consistent. Guests can request their car be brought to the location of their choice (within a defined radius) from the comfort of their dinner table, theater seat, or place at the blackjack table. They know when their vehicle will be ready, and can meet it curbside. Payment can happen automatically via a saved credit card on file or with a quick swipe at the Parking System podium.

The Parking System's drop-off/pick-up service eliminates all of the stress associated with parking in an unknown/dangerous parking facility or with an unfamiliar valet operation. When drivers see the Parking System in operation, they know they're getting premium service from a trusted provider.

Drivers can locate any operator within the Parking System's network on their mobile phones, navigation systems or driverless cars. Additionally, transaction processing is seamless and eliminates the need to provide cash or run a credit card.

The Parking System's technology platform consists of several components. One component is a web-based application suite for The Parking System's operator-partners that provides the means to configure and monitor stations and parking zones, schedule labor, generate reports and review performance statistics. The configuration data input via web-based application suite the parking event server's behavior for the needs of each operator-partner.

Another component is the Operations Apps. The operations apps are geared solely towards operators, providing on-site access to the parking event server's set of parking management features, including a terminal designed to give runners a separate view of the parking event server's queue and allow them to claim vehicle drop-off and pick-up tasks as they are scanned into the system by the lead manager.

Figure 13:
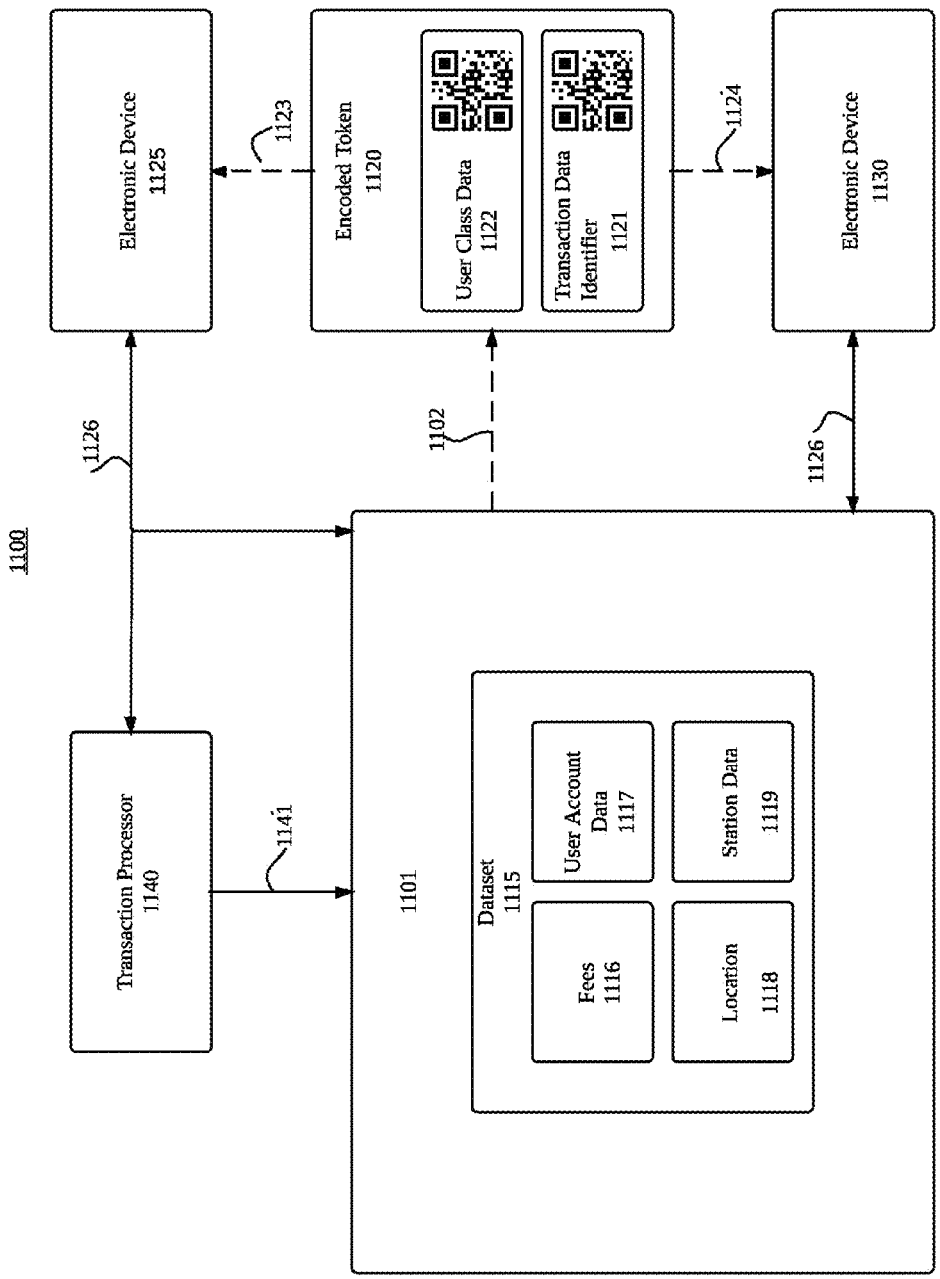
FIG. 13 illustrates the relationships and communication paths between several components of the parking system according to some of the inventive principles of this patent disclosure.
Figure 14:
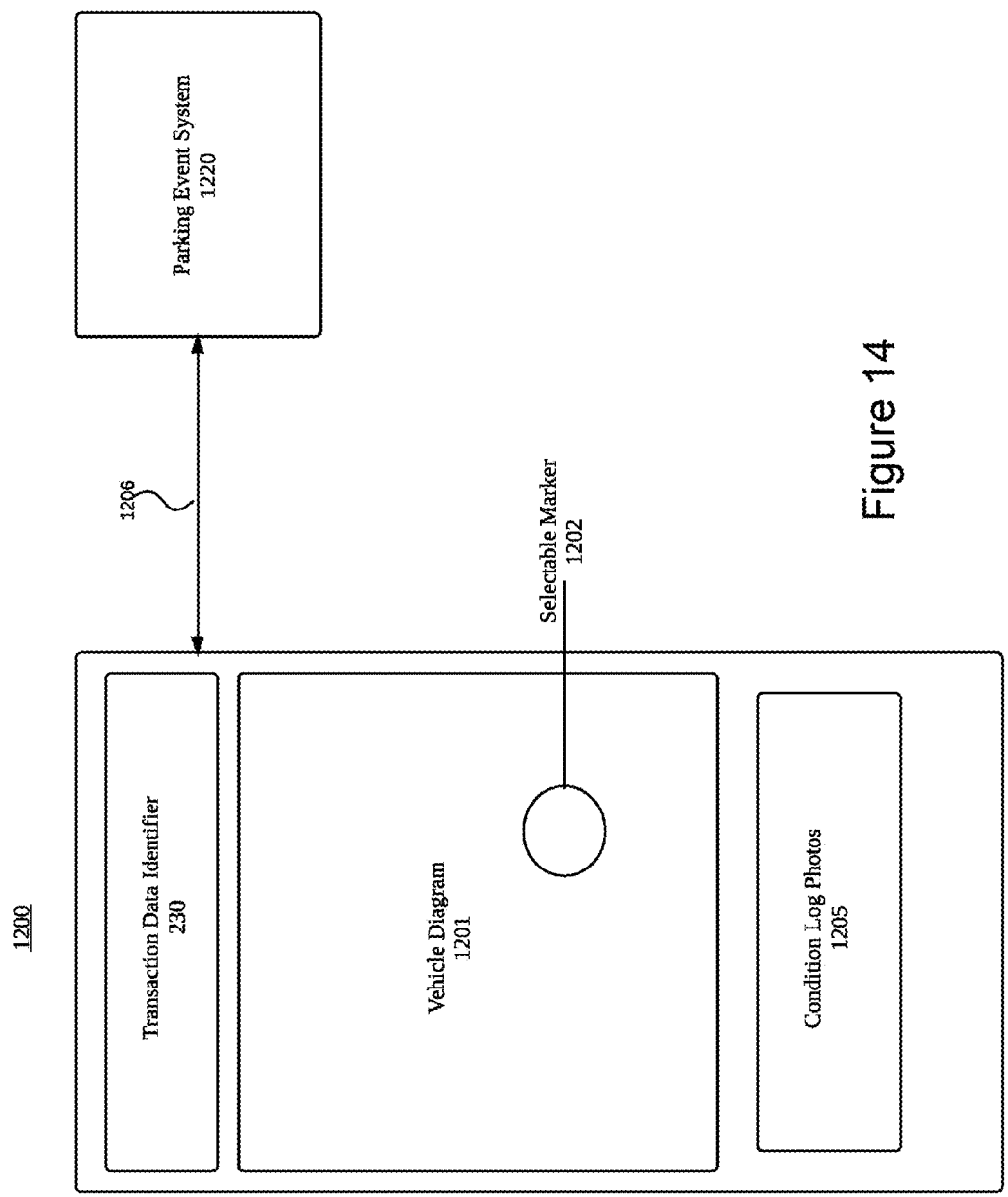
FIG. 14 illustrates an embodiment of the dataset stored on the parking event system that can include a vehicle diagram and vehicle condition log photos according to some of the inventive principles of this patent disclosure.
Figure 15:
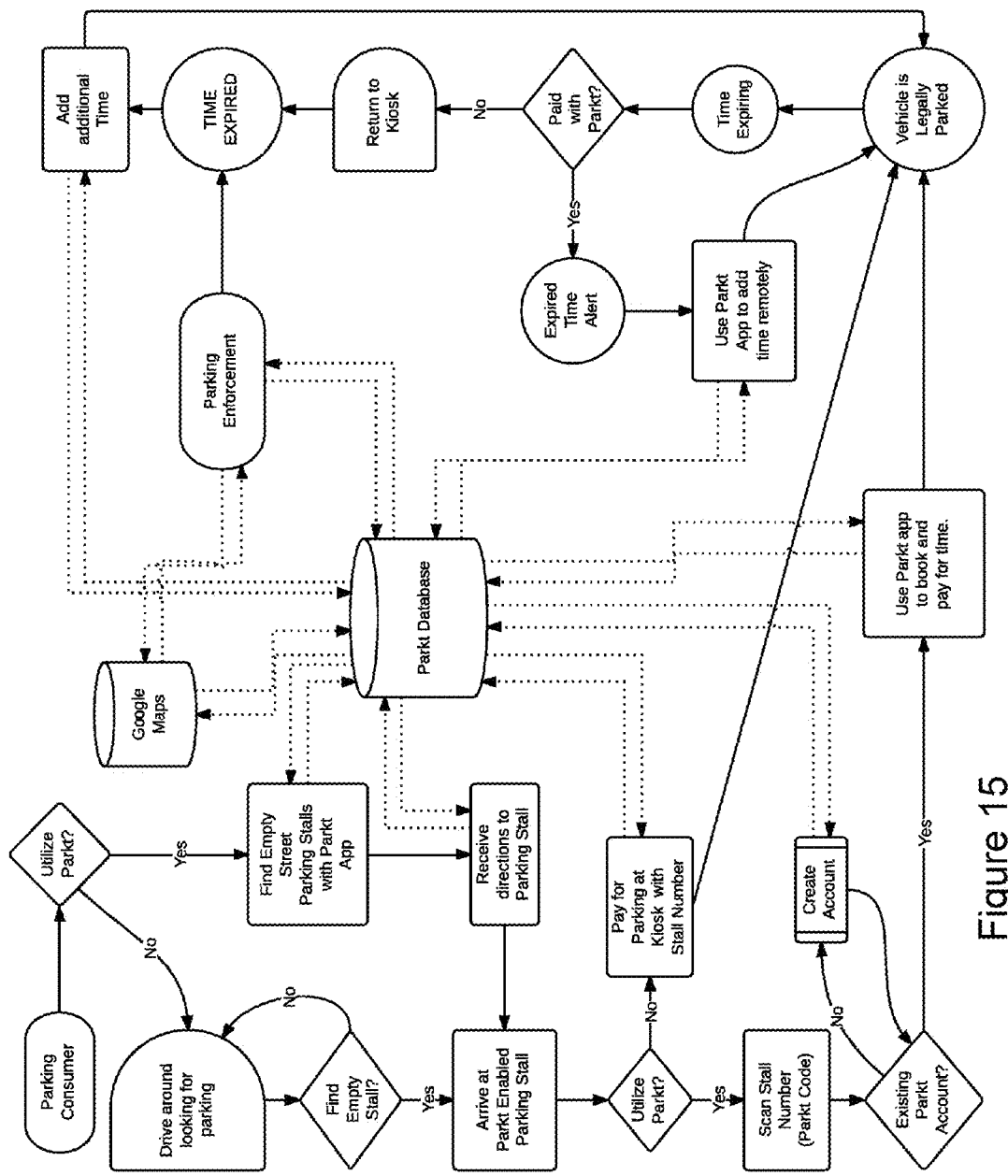
FIG. 15 is a flow diagram illustrating how a driver might interact with a municipal street parking embodiment of the parking system according to some of the inventive principles of this patent disclosure.
Figure 17:
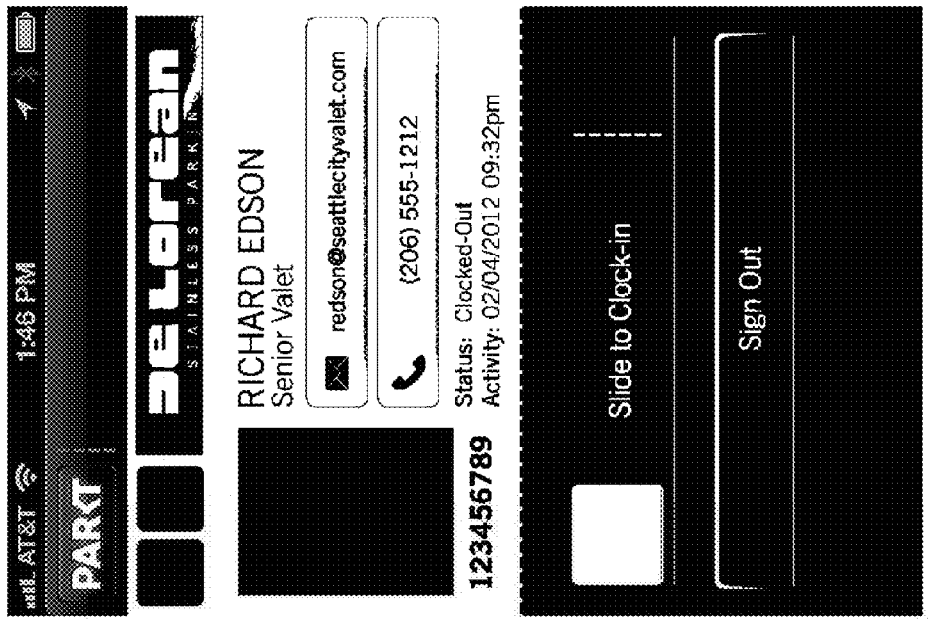
FIG. 17 depicts a user interface that displays user information stored on the parking event server according to some of the inventive principles of this patent disclosure.
Figure 16:
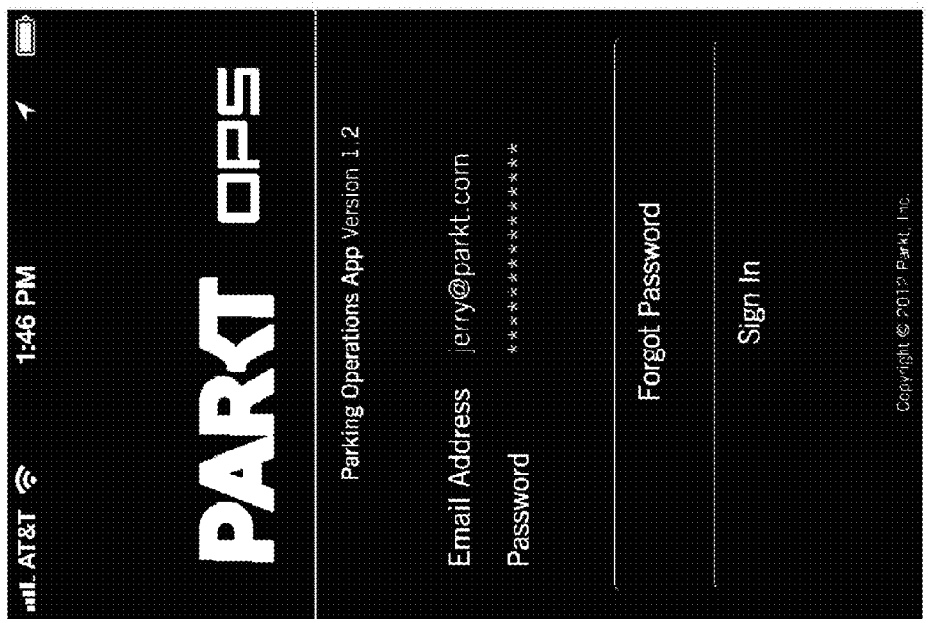
FIG. 16 depicts a user interface that provides the means for an attendant to sign into a user account stored on a parking event server via an electronic device according to some of the inventive principles of this patent disclosure.
Figure 19:
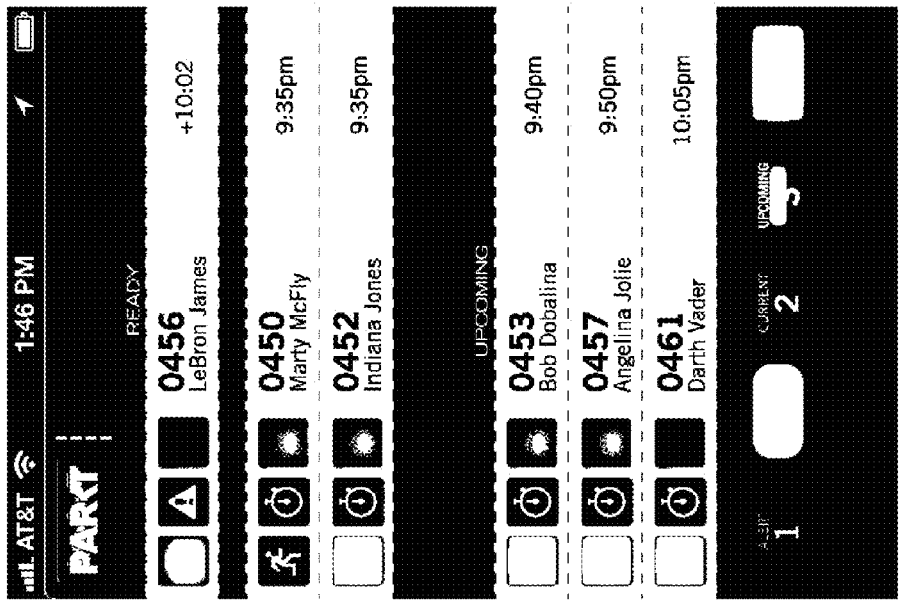
FIG. 19 depicts a user interface that displays a visual representation of the queue managed by the parking event server as well as individual transaction data identifiers and associated data according to some of the inventive principles of this patent disclosure.
Figure 18:
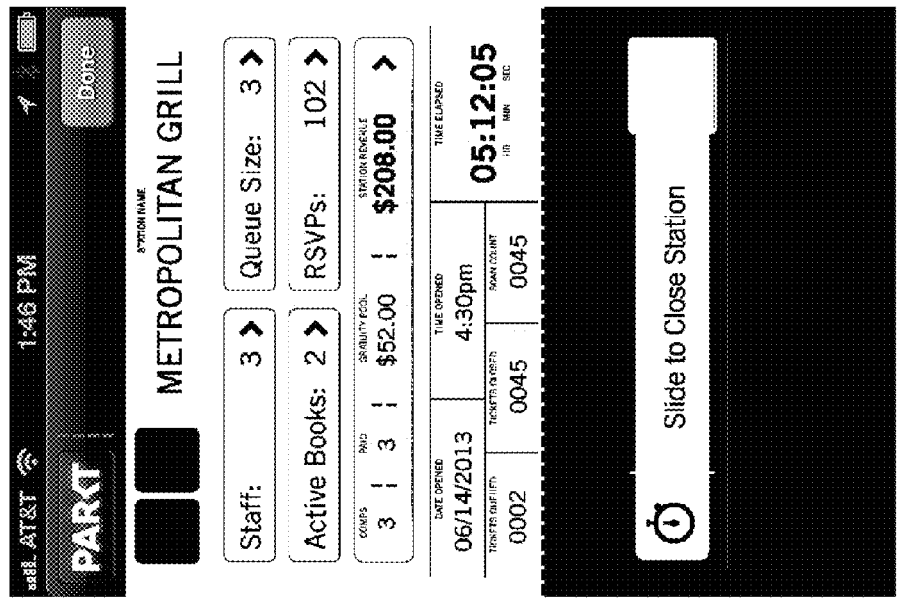
FIG. 18 depicts a user interface that allows an attendant to open and close operating sessions and monitor parking activity, revenue, staff allocation and manage settings on the parking event server from an electronic device according to some of the inventive principles of this patent disclosure.
Figure 21:
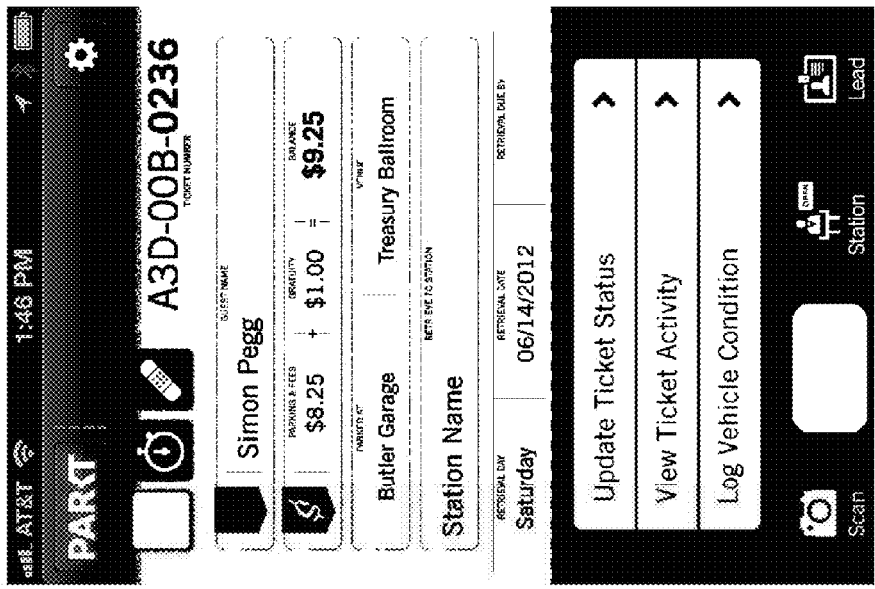
FIG. 21 depicts a user interface displaying details from the dataset stored on the parking event server for a particular transaction data identifier, as well as buttons for interacting with said data according to some of the inventive principles of this patent disclosure.
Figure 20:
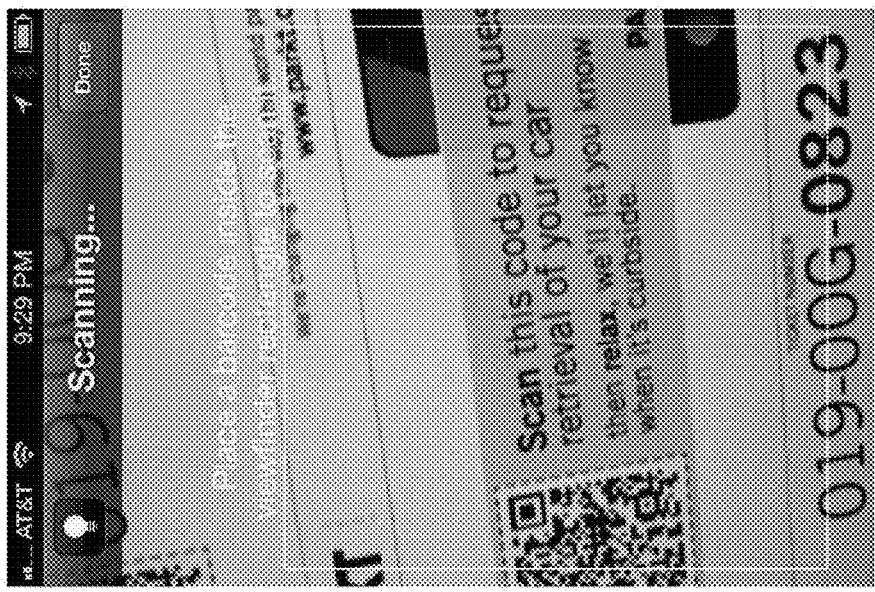
FIG. 20 depicts a user interface for scanning an optically encoded version of an encoded token that includes a transaction data identifier according to some of the inventive principles of this patent disclosure.
Figure 23:
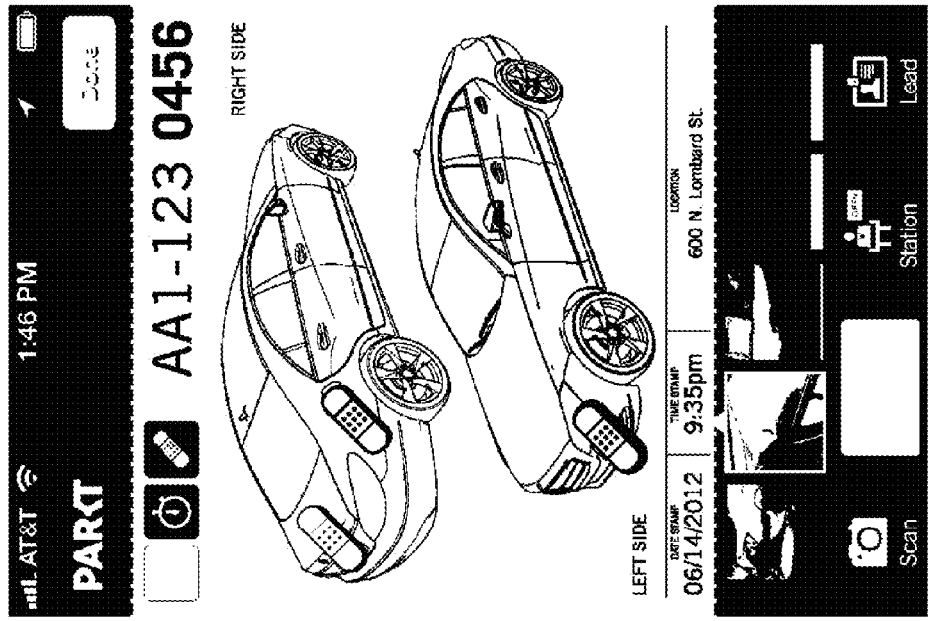
FIG. 23 depicts a user interface that provides a means to display and record damage on a vehicle including the location of the damage and photos of the damage as well as recording the time and location the photos were taken according to some of the inventive principles of this patent disclosure.
Figure 22:
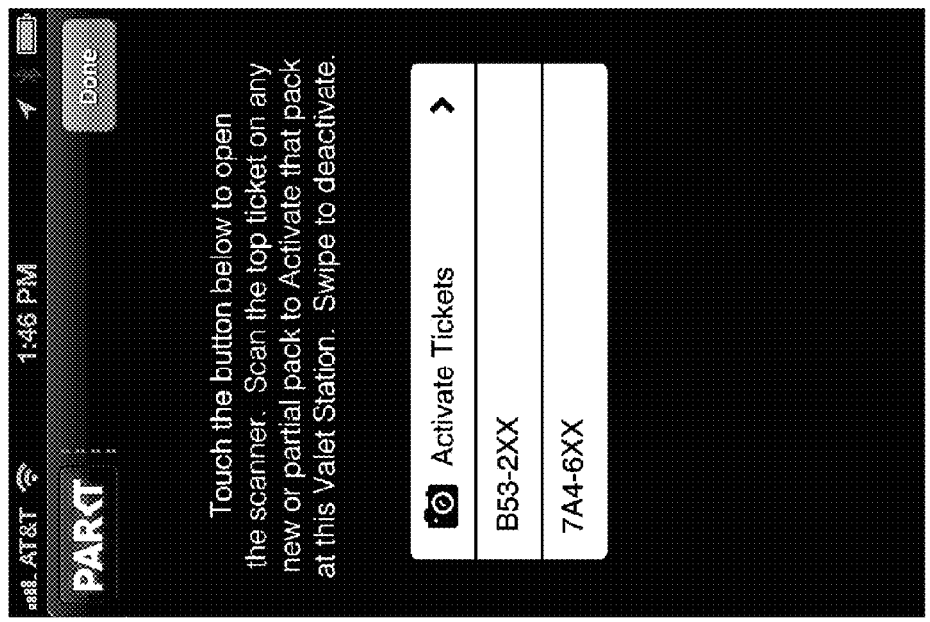
FIG. 22 depicts a user interface that provides a means to register bundles of transaction data identifiers with the parking event server and to show which bundles are already registered according to some of the inventive principles of this patent disclosure.
Figure 25:
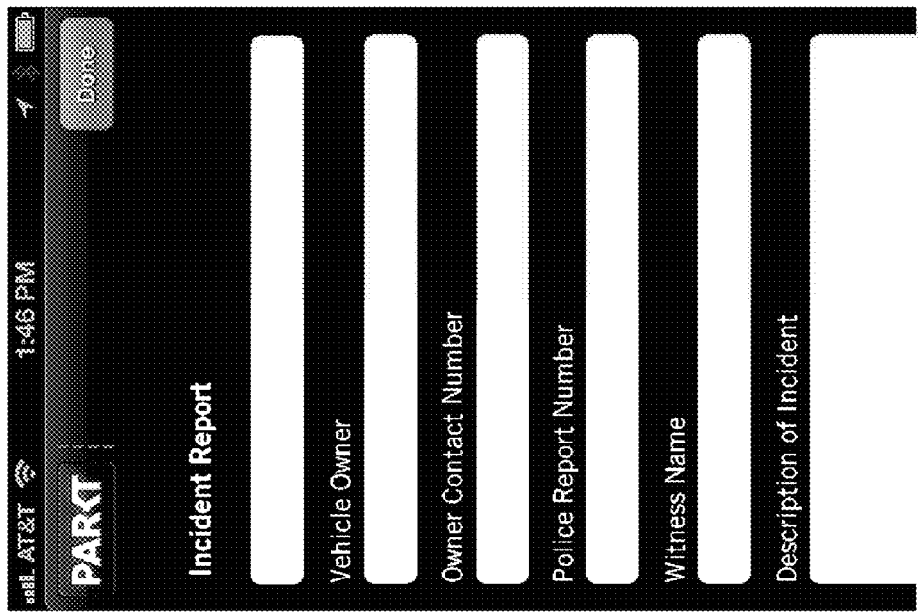
FIG. 25 depicts a user interface that provides a means to record an incident report on an electronic device to be stored on the parking event server according to some of the inventive principles of this patent disclosure.
Figure 24:
FIG. 24 depicts a user interface that provides a means to display information about vehicle condition and damage including photos, locations and times stored on the parking event server according to some of the inventive principles of this patent disclosure.
Figures 26, 27:
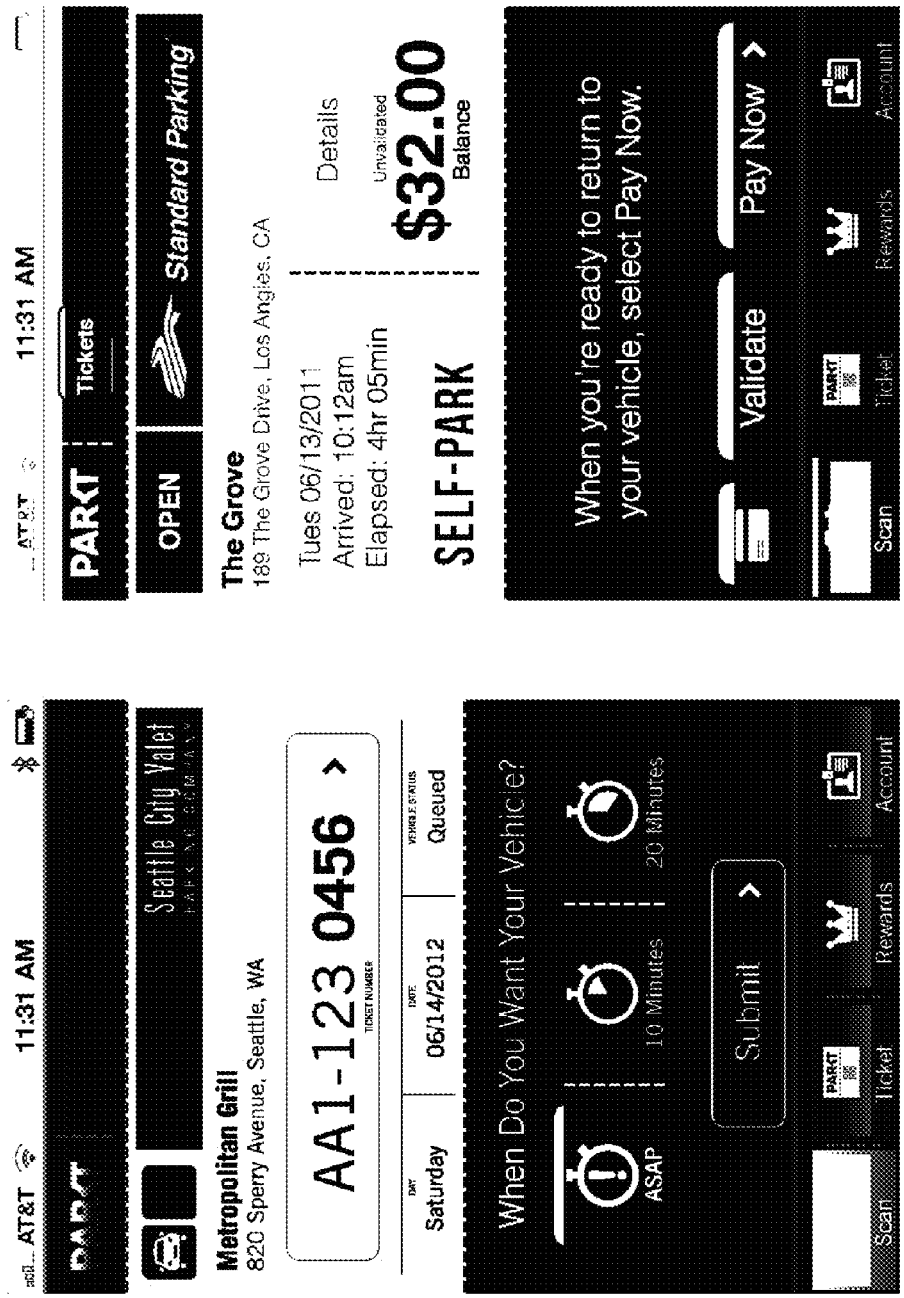
FIG. 26 depicts a user interface that displays data associated with a transaction data identifier and buttons to request a delivery time slot assignment according to some of the inventive principles of this patent disclosure.
FIG. 27 depicts a user interface that displays data associated with a transaction data identifier including a fee owed to a parking provider and buttons to validate or issue payment according to some of the inventive principles of this patent disclosure.
Figure 29:
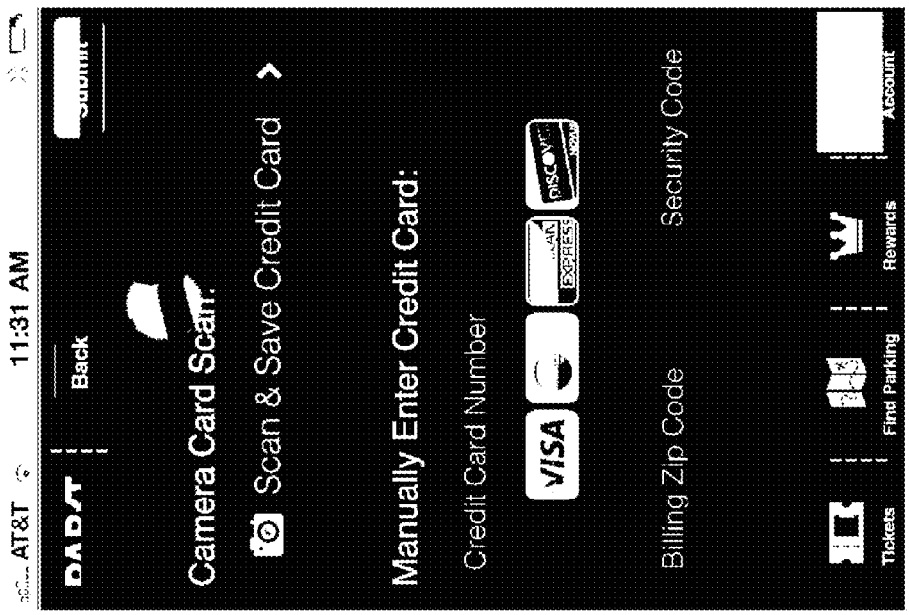
FIG. 29 depicts a user interface for entering and payment information such as a credit card on an electronic device to be stored on the parking event server according to some of the inventive principles of this patent disclosure.
Figure 28:
FIG. 28 depicts a user interface and optically encoded token in an embodiment for receiving and using a free parking coupon according to some of the inventive principles of this patent disclosure.
Figure 31:
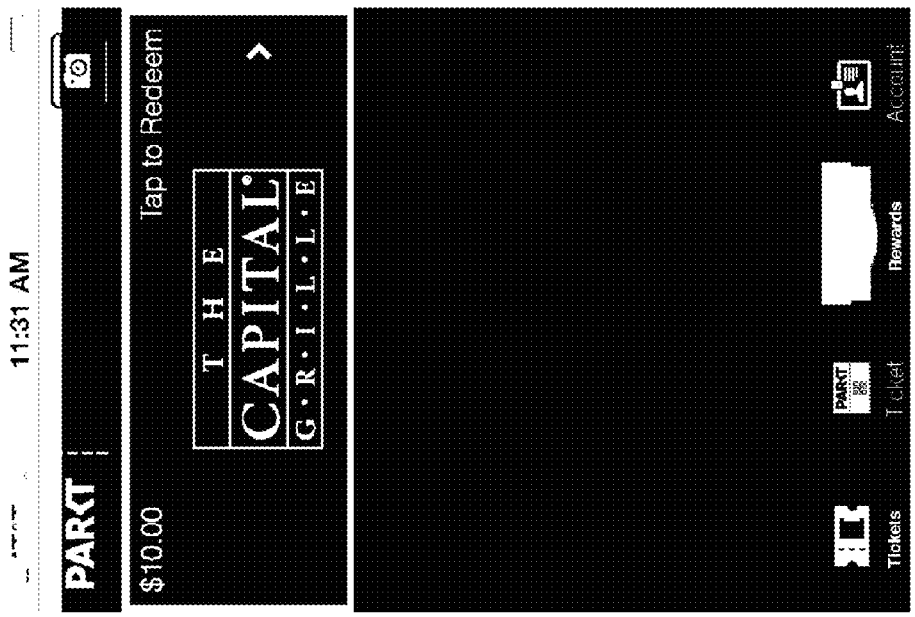
FIG. 31 depicts a user interface that displays a listing of digital coupons earned by a driver by visiting a particular location according to some of the inventive principles of this patent disclosure.
Figure 30:
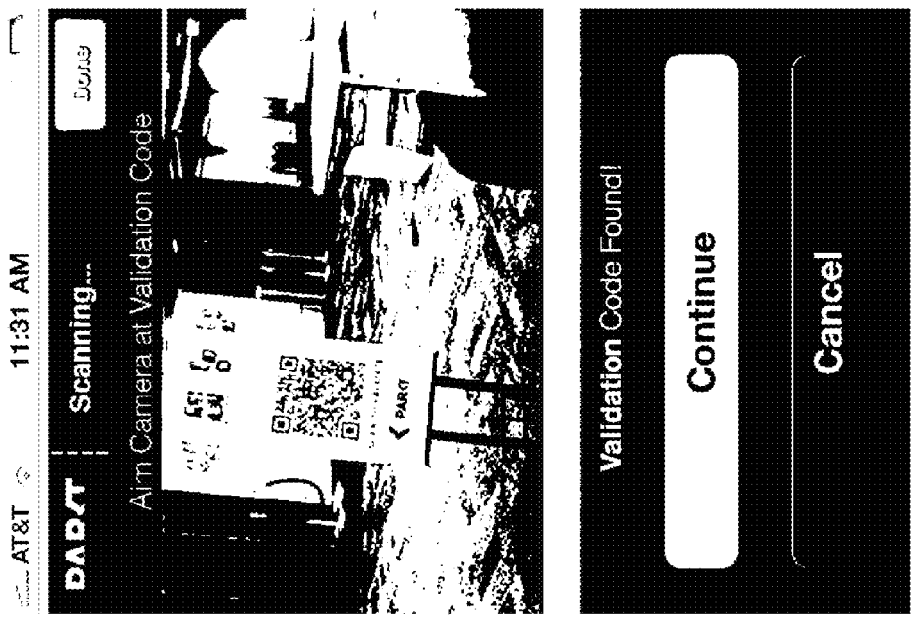
FIG. 30 depicts a user interface and validation code signage for associating parking validation to a transaction data identifier via an optical scan with an electronic device according to some of the inventive principles of this patent disclosure.
Figure 33:
FIG. 33 depicts a user interface that provides a user confirmation of a vehicle retrieval time slot according to some of the inventive principles of this patent disclosure.
Figure 32:
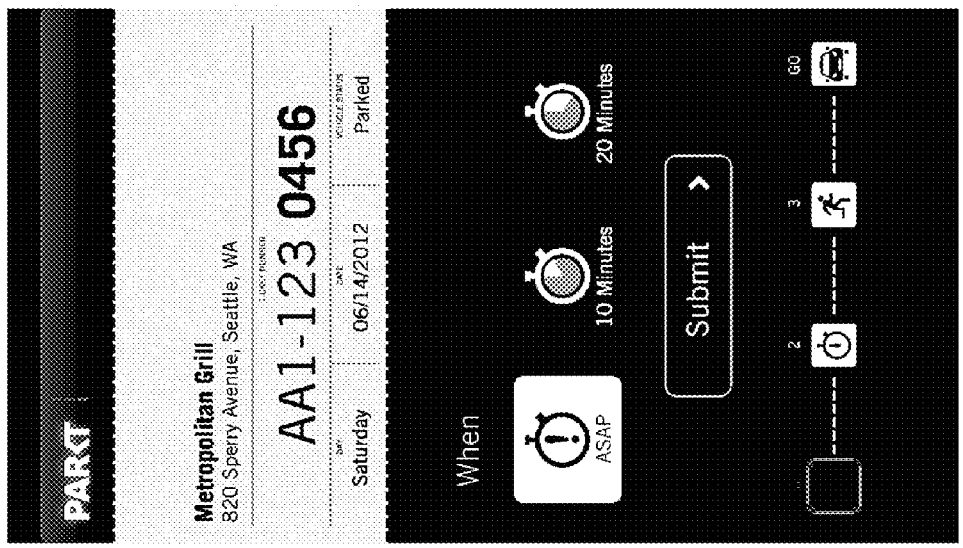
FIG. 32 depicts a user interface that provides a user the means to schedule retrieval of their vehicle by requesting a particular time slot on the parking event server from an electronic device according to some of the inventive principles of this patent disclosure.
Figure 34:
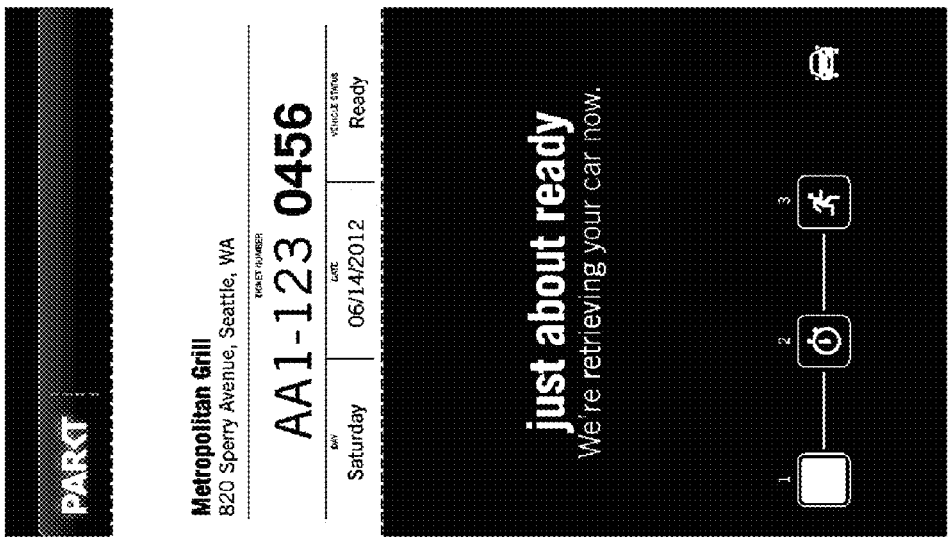
FIGS. 34 and 35 depict user interfaces that provide a user with a notification of the status of their vehicle retrieval according to some of the inventive principles of this patent disclosure.
Figure 35:
Figure 37:
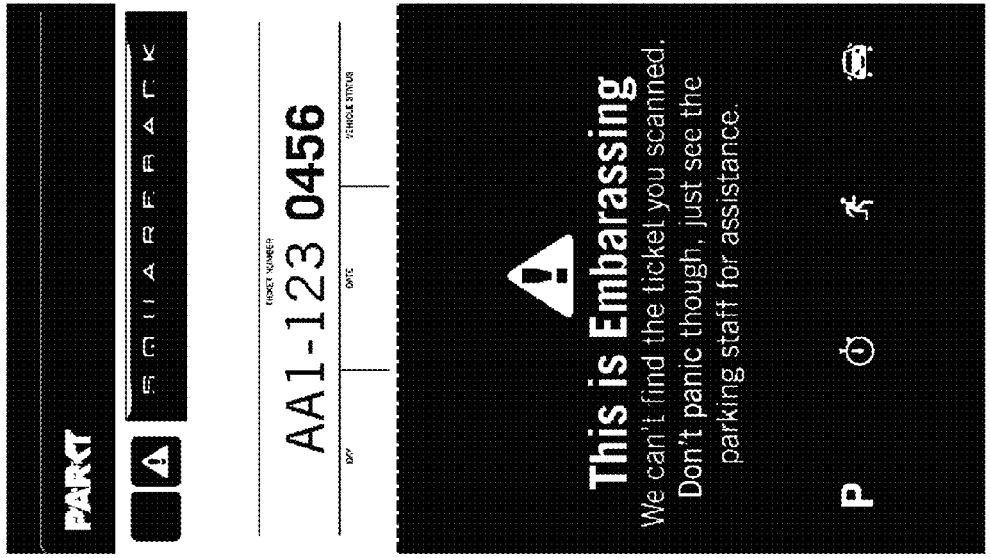
FIG. 37 depicts a user interface that informs a user that the transaction data identifier they are looking for cannot be found, according to some of the inventive principles of this patent disclosure.
Figure 36:
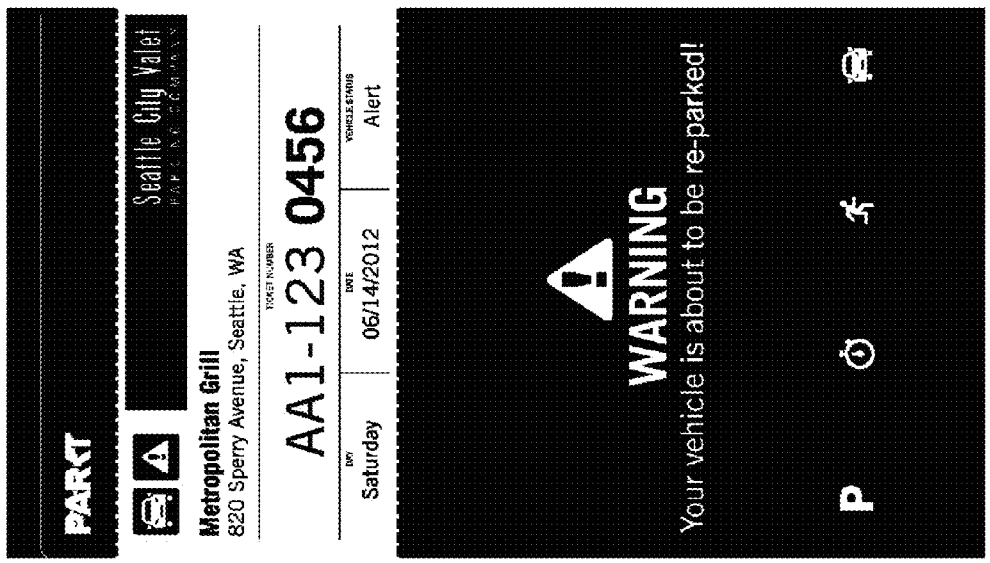
FIG. 36 depicts a user interface that warns a user that their vehicle is overdue for pick-up according to some of the inventive principles of this patent disclosure.
Figure 38:
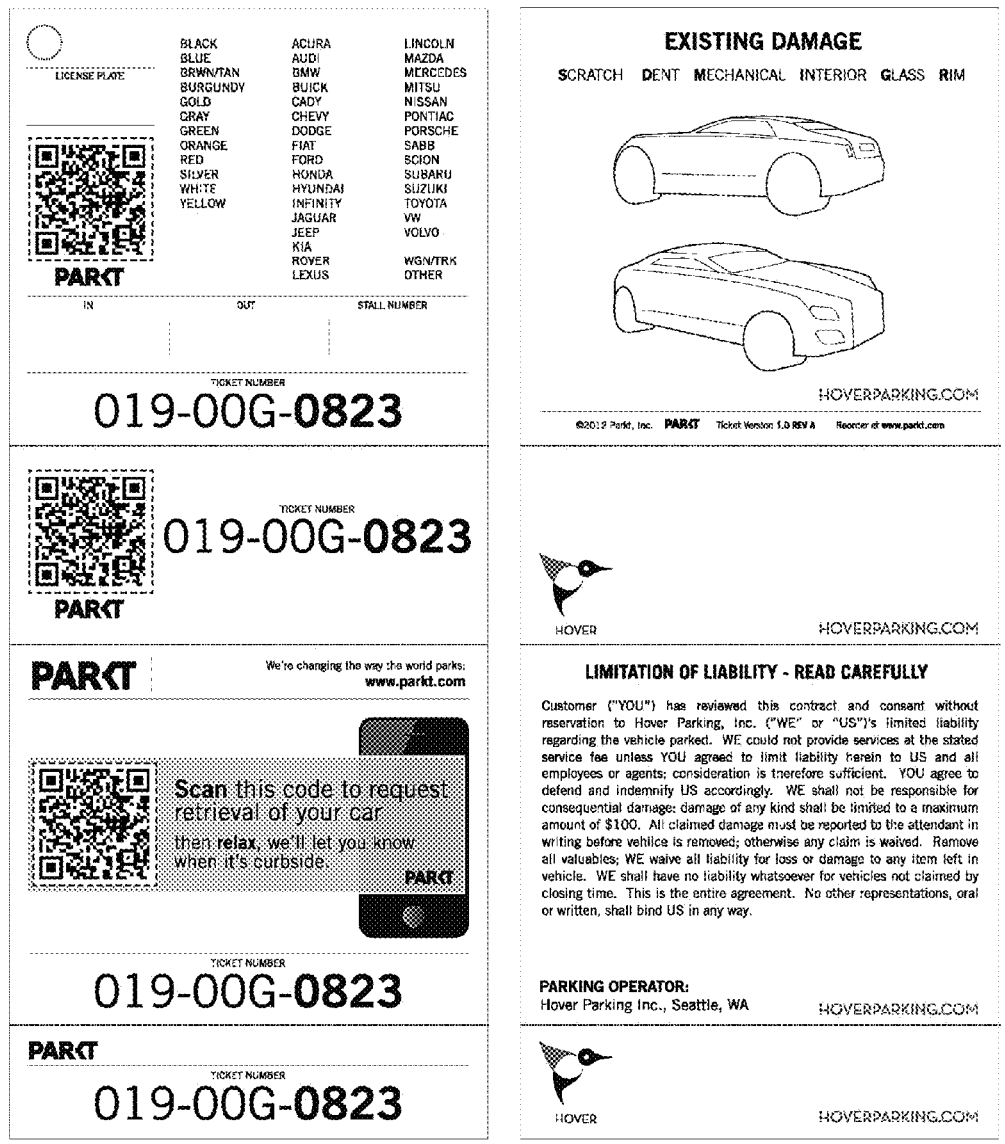
FIG. 38 depicts one embodiment of an encoded token and transaction data identifier printed on a three part paper valet parking ticket according to some of the inventive principles of this patent disclosure.

Another component is the Parking Data Communications System. FIG. 13 shows a block diagram of a parking data communications system 1100 in accordance with an embodiment of the present invention. The Parking Data Communications System 1100 may include, among other things, a Transaction Processor 1140, a first electronic device 1125, a second electronic device 1130, a parking event server 1101, a Dataset 1115 that includes, among other things, data relating to Fees 1116, User Accounts 1117, Locations 1118, and other data related to the Park Zone or Station 1119. The Parking Data Communications System 1100 may include an Encoded Token 1120, which contains a Transaction Data Identifier 1121 and User Class Data 1122. The consumer apps provide an elegant interface to request vehicle retrieval and pay parking fees. The consumer apps also enable drivers to locate participating parking system operator in a location of their choosing. Lastly, the consumer apps allow the consumer to automatically request retrieval of their vehicle to their current location and to automatically transact payment with a stored payment profile via the Transaction Processor 1140.

The Parking Data Communications system 1100 includes a secure Encoded Token 1120 that allows any object or location to be tied to a corresponding Dataset 1115 within the parking event server 1101. By decoding the encoded token and transmitting the User Class Data 1122 and Transaction Data Identifier 1121, for example by scanning an optically encoded version of the encoded token 1120, users can access and interact with the associated data attributes contained in the Dataset 1115 the Electronic Device 1130 or 1125, including transacting payment with Transaction Processor 1140 for associated Fees 1116 contained in Dataset 1115. Paths 1141, 1126, 1123, 1102, 1124, and 1126 show how data communications may flow between the various components of the Parking Data Communications system 1100. Dashed lines indicate the possibility of a one-way communication flow, if, for example, the encoded token 1120 is embodied in a physical, passive object that isn't capable of independent transmission such as a printed ticket.

Another component is the Parking Event Server, which manages event queuing, data storage and drives the Parking Data Communications System. Since parking patrons often arrive and depart at similar times (e.g. morning/evening for commuters at garages, dinner time at restaurants) traditional parking garages/lots and valet stations are subject to drastic spikes in demand. To address this, The Parking Event Server's queue acts as a buffer to normalize spikes in demand, smooth operations, and minimize consumer dissatisfaction. The Parking Event Server's queue divides up time into discrete blocks. An operator specifies the maximum number of retrieval requests their park zone is equipped to handle in any block (based on staffing availability, distance to the parking zone, weather conditions, etc.). When all the request slots in a block have been filled, new requests are automatically pushed into the next block. This results in a flattening of the demand curve and smooth, predictable flow volume. The Parking Event Server also give the lead manager/operator a centralized data repository that tracks the status of all currently active tickets (Transaction Data Identifiers and Encoded Tokens), providing a birds-eye view of the entire operation and enabling informed decision-making that is accessible via the web-based application suite or the operations apps. With the information stored in the Parking Event Server, parking providers may interact with tickets in the queue via the operations apps, modify the ticket's data, and push notifications to the consumer apps about vehicle status in realtime. To further help with operations, The Parking Event Server can push automated notifications to The Operations Apps that alert parking staff when new requests arrive or a vehicle is overdue for delivery.

The Parking Event Server Queue opens the door to innovative dynamic pricing options as well. Since The Parking Event Server stores detailed records of every transaction, modeling consumer demand for particular blocks is straightforward. The Parking Event Server can accommodate variable pricing schemes to optimize revenue based on block demand. This is an especially attractive option for operators that serve venues with especially concurrent customer arrival and exit time (theaters, arenas, etc.). There is little doubt that some customers would gladly pay a considerable premium for a vehicle to be ready right as a concert or sporting event has ended rather than having to wait.

Figure 12:
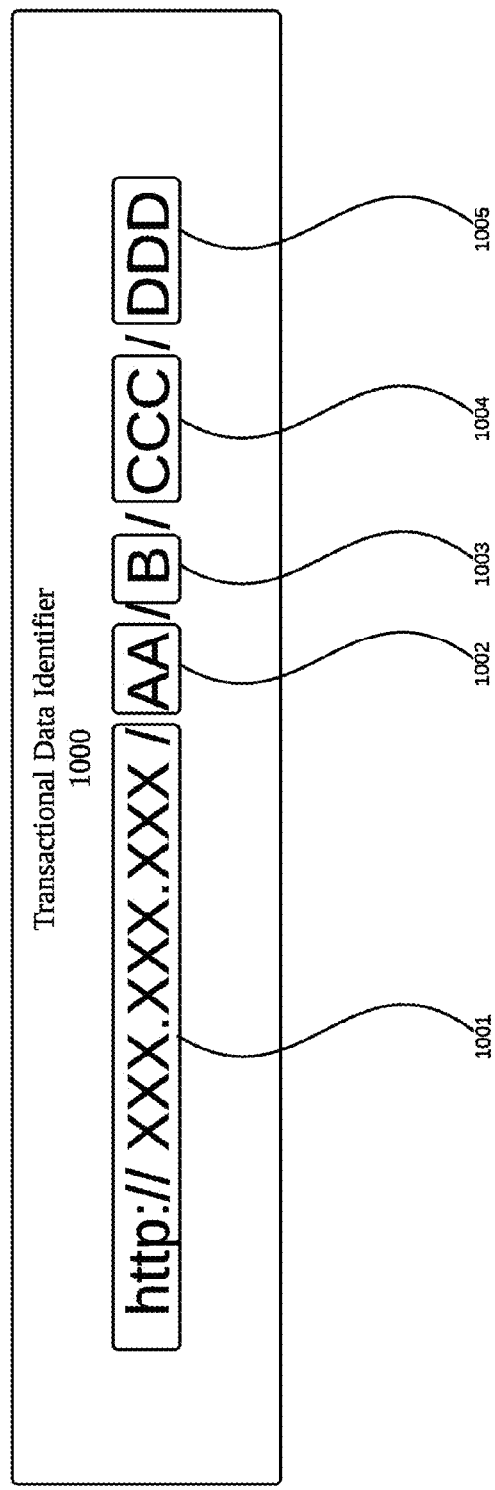
FIG. 12 illustrates an embodiment of a transaction data identifier according to some of the inventive principles of this patent disclosure.

A parking facility ticket is typically comprised of one or more stubs, which can include a valet stub, which is attached to the vehicle keys, a window stub placed on the parked car, and a guest stub, used by the consumer to claim the car at the podium. This ticket can be encoded with one or more Transaction Data Identifiers, allowing them to reference a Dataset stored on the Parking Event Server. A ticket encoded with these Transactional Data Identifiers functions as an encoded token that can be compatible with The Parking System. FIG. 12 shows a block diagram of a Transactional Data Identifier 1000 in accordance with an embodiment of the present invention. The Parking System introduces a distinct Transactional Data Identifier that can be associated with an encoded token. For example, the Transactional Data Identifier could be encoded to be optically scannable (such as a QR code) and printed on a ticket stub. The encoded token would now serve as an access point to the relevant Dataset stored in The Parking Event Server. A valet or consumer simply scans a the encoded token with a camera equipped smart device. The encoded token is decoded, revealing the Transactional Data Identifier which can include a URL 1001, an encoding type 1002, a Transactional Data Identifier Type 1003, a Secret Key 1004, and a Dataset Identifier 1005 and any other data needed to access the Dataset stored on the Parking Event Server. The encoding type 1002 indicates to The Parking Event Server what type of encoding is being utilized. The Transactional Data Identifier Type 1003 uses alpha-numeric values to denote a class level to the Transactional Data Identifier 1000. The Secret Key 1004 is a security feature which prevents snooping and spoofing of the Ticket Data Identifier 1000. The Dataset Identifier 1005 identifies the relevant dataset location or address on The Parking Event Server.

RISK MITIGATION

The Parking System can help mitigate the risks inherent in providing parking service. The Parking System spreads out valet demand in time by queuing vehicle retrieval requests in a controlled sequence that is aligned with labor resources. Valet attendants experience a more consistent demand curve and less pressure to deliver vehicles quickly, which results in less running, fewer accidents, fewer injuries. Management can review location volume and demand in real-time, allowing allocation of labor resources dynamically to reduce congestion and attendant stress. Management can identify emerging demand trends and adjust staffing to compensate. This results in the possibility of smart allocation of labor resources, early warning of changing demand trends, understaffing prevention, minimized congestion, and fewer accidents.

The Parking System provides a simple means to communicate parking and retrieval requests from guests or employees at a park zone to staff stationed at parking areas or other remote locations. This is less prone to communication errors than other communications methods such as using radios. The valets are less likely to make mistakes and subsequent rushing to correct them. Labor resources may be allocated more efficiently.

The Parking System offers accurate, computerized employee time-clocking that can assist validation of workers compensation claims. The Parking System can replace paper time sheets, yielding precise labor hour and location tracking.

The Parking System can collect and store detailed employee performance data that helps managers identify risky behavior and training deficiencies. This allows comparison of actual performance statistics to a pre-determined par that is calculated to minimize risk. Consistent sub-par or above-par performance highlights behavioral or training problems that may increase risk. Managers can identify problem employees and risk prone locations or situations before accidents happen. Continued monitoring of performance metrics guides formulation of best practices. Rich data collection lets managers analyze contributing factors and make changes to performance pars to prevent future incidents.

Accurate vehicle counting keeps managers apprised of potential garage over-crowding, a contributor to accidents. Detailed volume and flow metrics provide data for ongoing risk assessment. Managers can ensure that garage space is filled to safe capacities and know when more capacity is needed. They can prevent accidents and damage to vehicles due to overcrowding situations and identify emerging volume and capacity trends to prevent high risk situations.

The Parking System can include an incident reporting interface that guides workers through incident response procedures, helping them maintain calm and to collect consistent, time stamped data (including photographs) in a format approved by insurance carriers. Incident reports provide an accurate record of events and damage, minimizing disputes, errors and fraud and minimize reliance on hazy memories, hearsay or other unreliable sources of information.

Parking attendants can manually photograph existing damage on vehicles when they arrive at the park zone. All images are timestamped, geolocated and permanently associated with Transaction Data Identifier on the Parking Event Server. This will help prevent fraudulent damage claims and provide hard data to dispute damage claims.

Safety alerts and reminders can be sent to attendants and managers based on preset criteria to reinforce training and best practices. Criteria could include high volumes, time of day or inclement weather. If data show accidents are more likely during a particular day of the week or part of the year, alerts could be used to reinforce training and encourage best practices. If bad weather is expected, automated alerts could provide safety advice or other guidance to prevent problems.

Managers could use data stored on the Parking Event Server to monitor the routes used by attendants to move vehicles between park zones and parking areas and determine which are safest.

Analysis of system wide performance data could be used to predict when and in what situations accidents are most likely, making it possible to predict when extra precautions should be taken.

The invention claimed is:

1. A method comprising:
   associating a pre-existing dataset to one or more physical entities via association with an encoded token;
   monitoring interactions between the entity and the token;
   providing data from the dataset to the entity based on that monitoring; and
   updating the dataset with new or modified data from the entity by referencing the encoded token; and
   updating the dataset with new or modified data from a business that validates parking for its patrons;
   where:
      the dataset represents a valet parking event,
      the entities include a customer and the customer's vehicle,
      the interaction comprises the customer scanning the ticket and requesting retrieval of the customer's vehicle,
      the dataset is updated using a parking event server, and
      the business that validates parking for its patrons communicates with the parking event server through a computer network.

2. The method of claim 1 where the pre-existing dataset is the price of a transaction.

3. The method of claim 2 where the price for a parking transaction depends on the location of a delivery zone.

4. The method of claim 2 where the price depends on the time of day an interaction is initiated.

5. The method of claim 2 where the price depends on the duration between a first initiation of an interaction and a last initiation of an interaction for one or more encoded tokens.

6. The method of claim 1 where the encoded token is a paper ticket printed with a unique data identifier.

7. The method of claim 6 where the unique data identifier is encoded to be readable by electronic optical scan.

8. The method of claim 1 where the dataset includes an array of time slots.

9. The method of claim 8 where the particular time slot carries an additional price.

10. The method of claim 9 where the price of the time slot is set dynamically based on demand.

11. The method of claim 10 where a time slot may be sold to the highest bidder.

12. The method of claim 1 where the pre-existing dataset is modified to include photometric data showing the physical condition of the entity.

13. The method of claim 1 where a listing is generated by the interaction of an entity and a token.

14. The method of claim 1 where the price depends on the location of entity at the time interaction with the encoded token is initiated.

15. A method comprising:
   transmitting a vehicle retrieval request to a service provider including a delivery location;
   generating a listing event based on transmission of retrieval request;
   transmitting a dataset back to the retrieval requester;
   transmitting new or modified data to the service provider from a business that validates parking for its patrons; and
   delivering a physical entity to the retrieval requester at the delivery location;
   where:
      the listing event is generated using a parking event server, and
      the business that validates parking for its patrons communicates with the parking event server through a computer network.

16. The method of claim 15 where the particular dataset transmitted is determined by preset criteria.

17. The method of claim 16 where the preset criteria is stored in a profile contained in a database on a remote server.

* * * * *